(12) United States Patent
Park et al.

(10) Patent No.: US 11,641,565 B2
(45) Date of Patent: May 2, 2023

(54) MULTICAST SENSING-TRACKING REFERENCE SIGNAL

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Junyi Li, Fairless Hills, PA (US); Juan Montojo, San Diego, CA (US); Jing Sun, San Diego, CA (US); Xiaoxia Zhang, San Diego, CA (US); Peter Gaal, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 17/344,693

(22) Filed: Jun. 10, 2021

(65) Prior Publication Data
US 2022/0038864 A1 Feb. 3, 2022

Related U.S. Application Data

(60) Provisional application No. 63/059,731, filed on Jul. 31, 2020.

(51) Int. Cl.
*H04W 4/06* (2009.01)
*H04L 5/00* (2006.01)
*H04L 12/18* (2006.01)

(52) U.S. Cl.
CPC ............. *H04W 4/06* (2013.01); *H04L 5/0048* (2013.01); *H04L 12/189* (2013.01)

(58) Field of Classification Search
CPC ..... H04B 7/0619; H04L 5/0025; H04L 5/048; H04L 5/0094; H04L 12/189; H04W 4/06; H04W 4/50
See application file for complete search history.

(56) References Cited

U.S. PATENT DOCUMENTS

| | | | |
|---|---|---|---|
| 2018/0091212 A1* | 3/2018 | Lee | H04L 5/0048 |
| 2019/0103928 A1* | 4/2019 | Nagaraja | H04B 17/309 |
| 2019/0199496 A1* | 6/2019 | Qin | H04B 7/0617 |
| 2019/0320408 A1* | 10/2019 | Opshaug | G01S 5/0218 |
| 2022/0287109 A1* | 9/2022 | Huang | H04L 5/0051 |

OTHER PUBLICATIONS

International Search Report and Written Opinion—PCT/US2021/036988—ISA/EPO—dated Sep. 30, 2021.
(Continued)

*Primary Examiner* — Wutchung Chu
*Assistant Examiner* — Kai Chang
(74) *Attorney, Agent, or Firm* — Muncy, Geissler, Olds & Lowe, P.C./Qualcomm

(57) ABSTRACT

In an aspect, first and second UEs each detect a target associated with a deflection point for a transmission beam from a BS to the respective UE, and each transmit, to the BS, information associated with the target. The BS transmits STRS configuration information to the first and second UEs. The BS multicasts, to the first and second UEs, an STRS on the transmission beam in accordance with the STRS configuration information.

26 Claims, 27 Drawing Sheets

(56) References Cited

OTHER PUBLICATIONS

Vivo: "Discussion on Beam Measurement,Beam Reporting and Beam Indication,"3GPP Draft,3GPP TSG RAN WG1 NR Ad Hoc#3,R1-1715619_Disc on Beam Measurement,Beam Reporting and Beam Indication,3rd Gen Partnership Project(3GPP), Mobile Competence Cntre,650,Route Des Lucioles,F-06921,Sophia-Antipolis Cedex,FR,vol. RAN WG1. No.Nagoya,JP,Sep. 18, 2017-Sep. 21, 2017,Sep. 11, 2017(Sep. 11, 2017),XP051329096,10 pgs,Retrieved from internet;URL: http://www.3gpp.org/ftp/tsg_ran/WG1_RL1/TSGR1_AH/NR_AH_1709/Docs/ [ret Sep. 11, 2017]paras[2.1.5]. [2. 2.1],fig 3.

* cited by examiner

MULTICAST SENSING-TRACKING REFERENCE SIGNAL

CROSS-REFERENCE TO RELATED APPLICATIONS

The present Application for Patent claims the benefit of U.S. Provisional Application No. 63/059,731, entitled "MULTICAST SENSING-TRACKING REFERENCE SIGNAL," filed Jul. 31, 2020, assigned to the assignee hereof, and expressly incorporated herein by reference in its entirety.

BACKGROUND OF THE DISCLOSURE

1. Field of the Disclosure

Aspects of the disclosure relate generally to wireless communications, and more particularly to a multicast sensing-tracking reference signal (STRS).

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

5G enables the utilization of mmW RF signals for wireless communication between network nodes, such as base stations, user equipments (UEs), vehicles, factory automation machinery, and the like. However, mmW RF signals can be used for other purposes as well. For example, mmW RF signals can be used in weapons systems (e.g., as short-range fire-control radar in tanks and aircraft), security screening systems (e.g., in scanners that detect weapons and other dangerous objects carried under clothing), medicine (e.g., to treat disease by changing cell growth), and the like.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a base station includes receiving, from a first user equipment (UE), information associated with a first target, the first target associated with a deflection point for a transmission beam from the base station to the first UE; receiving, from a second UE, information associated with a second target, the second target being a deflection point for the transmission beam from the base station to the second UE; transmitting, to the first UE and the second UE, sensing-tracking reference signal (STRS) configuration information that is based on the information associated with the first target and the second target; and multicasting, to the first UE and the second UE, a sensing-tracking reference signal (STRS) on the transmission beam in accordance with the STRS configuration information.

In some aspects, the STRS configuration information is transmitted to the first UE and the second UE via unicast.

In some aspects, the first target and the second target correspond to a common target, and the STRS configuration information is transmitted without the base station having knowledge that the first target and the second target correspond to the common target.

In some aspects, a first STRS configuration information unicasted to the first UE comprises a first identifier that is specific to the first UE for the common target and wherein a second STRS configuration information unicasted to the second UE comprises a second identifier that is specific to the second UE for the common target.

In some aspects, the STRS configuration information is transmitted to the first UE and the second UE via multicast.

In some aspects, the STRS configuration information is transmitted to the first and second UEs via multicast in response to determining, at the base station, that the first target and the second target correspond to a common target.

In some aspects, the multicasted STRS configuration information comprises a network-specific identifier for the common target.

In some aspects, the STRS configuration information is transported via radio resource control (RRC) signaling, media access control command element (MAC-CE) signaling, or downlink control information (DCI) signaling.

In an aspect, a method of operating a user equipment (UE) includes detecting a target associated with a deflection point for a transmission beam from a base station to the UE; transmitting, to the base station, information associated with the target; receiving, from the base station, sensing-tracking reference signal (STRS) configuration information that is based on the information associated with the target; and receiving a multicasted a sensing-tracking reference signal (STRS) on a receive beam associated with the transmission beam in accordance with the STRS configuration information.

In some aspects, the STRS configuration information is received via unicast.

In some aspects, the STRS configuration information comprises an identifier for the target that is specific to the UE.

In some aspects, the STRS configuration information is received via multicast.

In some aspects, the multicasted STRS configuration information comprises a network-specific identifier for the target.

In some aspects, the STRS configuration information is transported via radio resource control (RRC) signaling, media access control command element (MAC-CE) signaling, or downlink control information (DCI) signaling.

In an aspect, a base station includes a memory; at least one transceiver; and at least one processor communicatively coupled to the memory and the at least one transceiver, the at least one processor configured to: receive, via the at least one transceiver, from a first user equipment (UE), information associated with a first target, the first target associated with a deflection point for a transmission beam from the base station to the first UE; receive, via the at least one transceiver, from a second UE, information associated with a second target, the second target being a deflection point for the transmission beam from the base station to the second UE; transmit, via the at least one transceiver, to the first UE and the second UE, sensing-tracking reference signal (STRS) configuration information that is based on the information associated with the first target and the second target; and multicast, to the first UE and the second UE, a sensing-tracking reference signal (STRS) on the transmission beam in accordance with the STRS configuration information.

In some aspects, the STRS configuration information is transmitted to the first UE and the second UE via unicast.

In some aspects, the first target and the second target correspond to a common target, and the STRS configuration information is transmitted without the base station having knowledge that the first target and the second target correspond to the common target.

In some aspects, a first STRS configuration information unicasted to the first UE comprises a first identifier that is specific to the first UE for the common target and wherein a second STRS configuration information unicasted to the second UE comprises a second identifier that is specific to the second UE for the common target.

In some aspects, the STRS configuration information is transmitted to the first UE and the second UE via multicast.

In some aspects, the STRS configuration information is transmitted to the first and second UEs via multicast in response to determining, at the base station, that the first target and the second target correspond to a common target.

In some aspects, the multicasted STRS configuration information comprises a network-specific identifier for the common target.

In some aspects, the STRS configuration information is transported via radio resource control (RRC) signaling, media access control command element (MAC-CE) signaling, or downlink control information (DCI) signaling.

In an aspect, a user equipment (UE) includes a memory; at least one transceiver; and at least one processor communicatively coupled to the memory and the at least one transceiver, the at least one processor configured to: detect a target associated with a deflection point for a transmission beam from a base station to the UE; transmit, via the at least one transceiver, to the base station, information associated with the target; receive, via the at least one transceiver, from the base station, sensing-tracking reference signal (STRS) configuration information that is based on the information associated with the target; and receive, via the at least one transceiver, a multicasted a sensing-tracking reference signal (STRS) on a receive beam associated with the transmission beam in accordance with the STRS configuration information.

In some aspects, the STRS configuration information is received via unicast.

In some aspects, the STRS configuration information comprises an identifier for the target that is specific to the UE.

In some aspects, the STRS configuration information is received via multicast.

In some aspects, the multicasted STRS configuration information comprises a network-specific identifier for the target.

In some aspects, the STRS configuration information is transported via radio resource control (RRC) signaling, media access control command element (MAC-CE) signaling, or downlink control information (DCI) signaling.

In an aspect, a base station includes means for receiving, from a first user equipment (UE), information associated with a first target, the first target associated with a deflection point for a transmission beam from the base station to the first UE; means for receiving, from a second UE, information associated with a second target, the second target being a deflection point for the transmission beam from the base station to the second UE; means for transmitting, to the first UE and the second UE, sensing-tracking reference signal (STRS) configuration information that is based on the information associated with the first target and the second target; and means for multicasting, to the first UE and the second UE, a sensing-tracking reference signal (STRS) on the transmission beam in accordance with the STRS configuration information.

In an aspect, wherein the STRS configuration information is transmitted to the first UE and the second UE via unicast.

In some aspects, the first target and the second target correspond to a common target, and the STRS configuration information is transmitted without the base station having knowledge that the first target and the second target correspond to the common target.

In some aspects, a first STRS configuration information unicasted to the first UE comprises a first identifier that is specific to the first UE for the common target and wherein a second STRS configuration information unicasted to the second UE comprises a second identifier that is specific to the second UE for the common target.

In an aspect, wherein the STRS configuration information is transmitted to the first UE and the second UE via multicast.

In some aspects, the STRS configuration information is transmitted to the first and second UEs via multicast in response to determining, at the base station, that the first target and the second target correspond to a common target.

In some aspects, the multicasted STRS configuration information comprises a network-specific identifier for the common target.

In an aspect, wherein the STRS configuration information is transported via radio resource control (RRC) signaling, media access control command element (MAC-CE) signaling, or downlink control information (DCI) signaling.

In an aspect, a user equipment (UE) includes means for detecting a target associated with a deflection point for a transmission beam from a base station to the UE; means for transmitting, to the base station, information associated with the target; means for receiving, from the base station, sensing-tracking reference signal (STRS) configuration information that is based on the information associated with the target; and means for receiving a multicasted a sensing-tracking reference signal (STRS) on a receive beam associated with the transmission beam in accordance with the STRS configuration information.

In some aspects, the STRS configuration information is received via unicast.

In some aspects, the STRS configuration information comprises an identifier for the target that is specific to the UE.

In some aspects, the STRS configuration information is received via multicast.

In some aspects, the multicasted STRS configuration information comprises a network-specific identifier for the target.

In some aspects, the STRS configuration information is transported via radio resource control (RRC) signaling, media access control command element (MAC-CE) signaling, or downlink control information (DCI) signaling.

In an aspect, a non-transitory computer-readable medium storing computer-executable instructions that, when executed by a base station, cause the base station to: receive, from a first user equipment (UE), information associated with a first target, the first target associated with a deflection point for a transmission beam from the base station to the first UE; receive, from a second UE, information associated with a second target, the second target being a deflection point for the transmission beam from the base station to the second UE; transmit, to the first UE and the second UE, sensing-tracking reference signal (STRS) configuration information that is based on the information associated with the first target and the second target; and multicast, to the first UE and the second UE, a sensing-tracking reference signal (STRS) on the transmission beam in accordance with the STRS configuration information.

In some aspects, the STRS configuration information is transmitted to the first UE and the second UE via unicast.

In some aspects, the first target and the second target correspond to a common target, and the STRS configuration information is transmitted without the base station having knowledge that the first target and the second target correspond to the common target.

In some aspects, a first STRS configuration information unicasted to the first UE comprises a first identifier that is specific to the first UE for the common target and wherein a second STRS configuration information unicasted to the second UE comprises a second identifier that is specific to the second UE for the common target.

In some aspects, the STRS configuration information is transmitted to the first UE and the second UE via multicast.

In some aspects, the STRS configuration information is transmitted to the first and second UEs via multicast in response to determining, at the base station, that the first target and the second target correspond to a common target.

In some aspects, the multicasted STRS configuration information comprises a network-specific identifier for the common target.

In some aspects, the STRS configuration information is transported via radio resource control (RRC) signaling, media access control command element (MAC-CE) signaling, or downlink control information (DCI) signaling.

In an aspect, a non-transitory computer-readable medium storing computer-executable instructions that, when executed by a user equipment (UE), cause the UE to: detect a target associated with a deflection point for a transmission beam from a base station to the UE; transmit, to the base station, information associated with the target; receive, from the base station, sensing-tracking reference signal (STRS) configuration information that is based on the information associated with the target; and receive a multicasted a sensing-tracking reference signal (STRS) on a receive beam associated with the transmission beam in accordance with the STRS configuration information.

In some aspects, the STRS configuration information is received via unicast.

In some aspects, the STRS configuration information comprises an identifier for the target that is specific to the UE.

In some aspects, the STRS configuration information is received via multicast.

In some aspects, the multicasted STRS configuration information comprises a network-specific identifier for the target.

In some aspects, the STRS configuration information is transported via radio resource control (RRC) signaling, media access control command element (MAC-CE) signaling, or downlink control information (DCI) signaling.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitations thereof.

DETAILED DESCRIPTION

Figure 1:
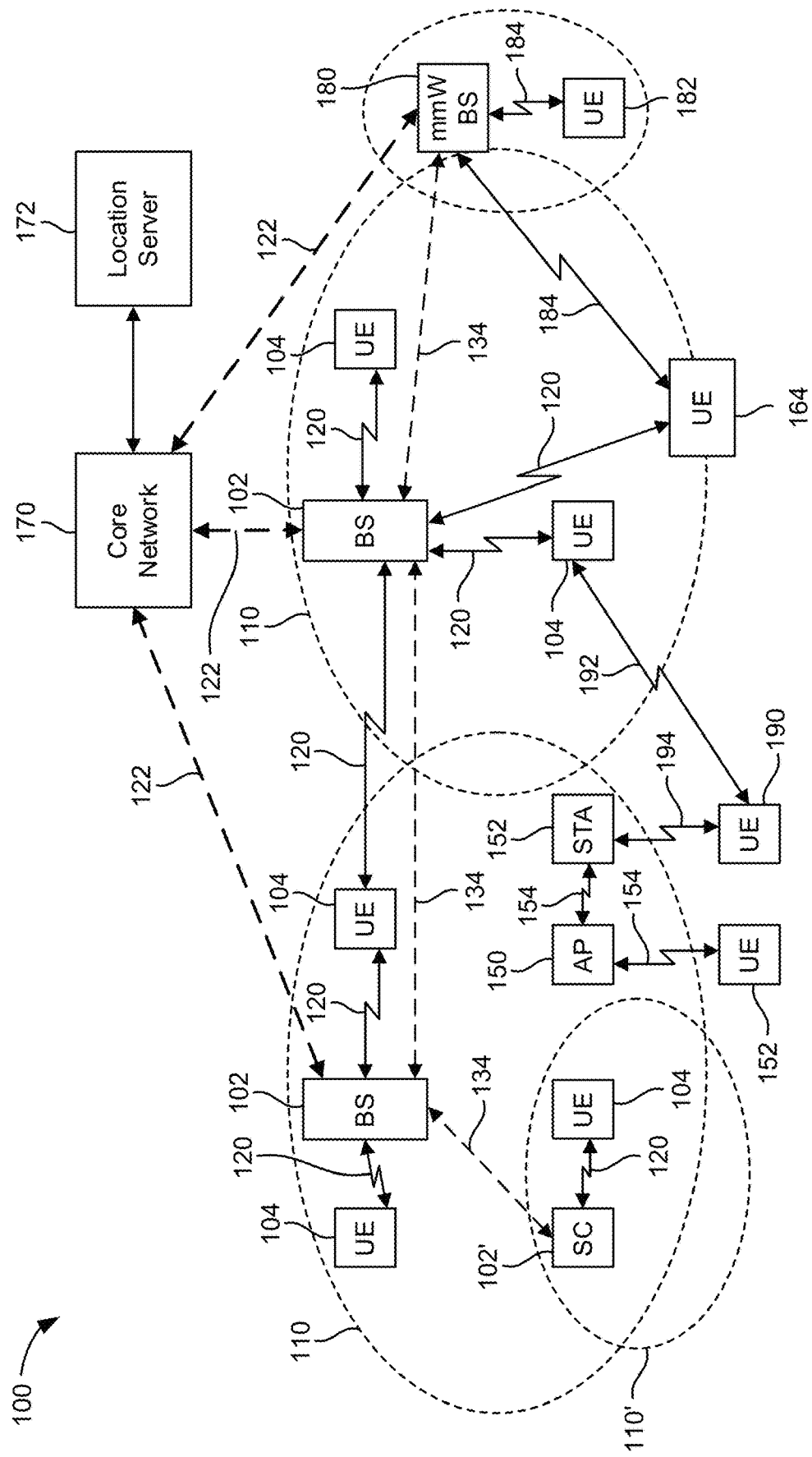
FIG. 1 illustrates an example wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" (BS) are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Referring to FIG. 1, an example wireless communications system 100 is shown. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
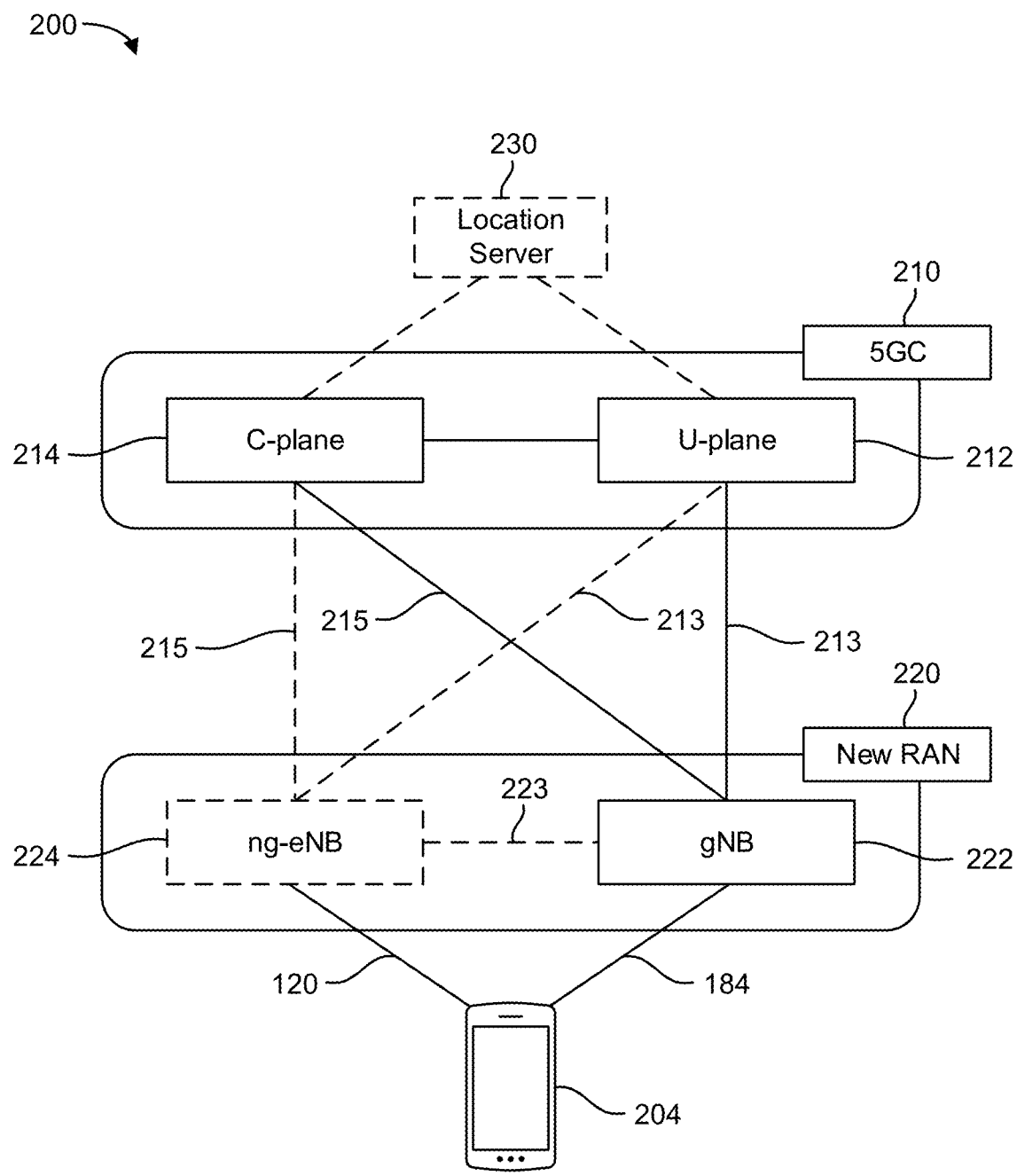
FIGS. 2A and 2B illustrate example wireless network structures, according to various aspects of the disclosure.

Referring to FIG. 2A, an example wireless network structure 200 is shown. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
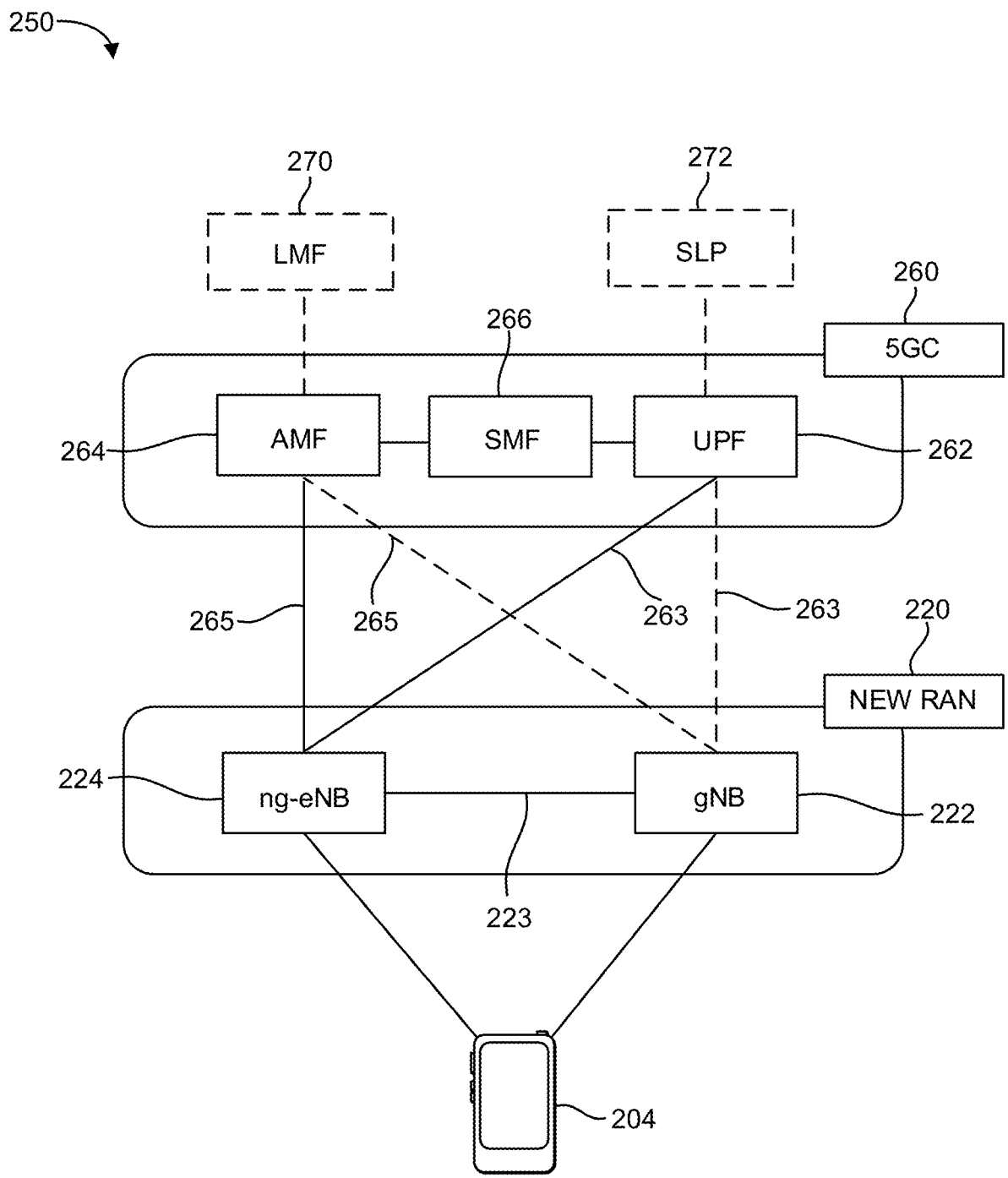

Referring to FIG. 2B, another example wireless network structure 250 is shown. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
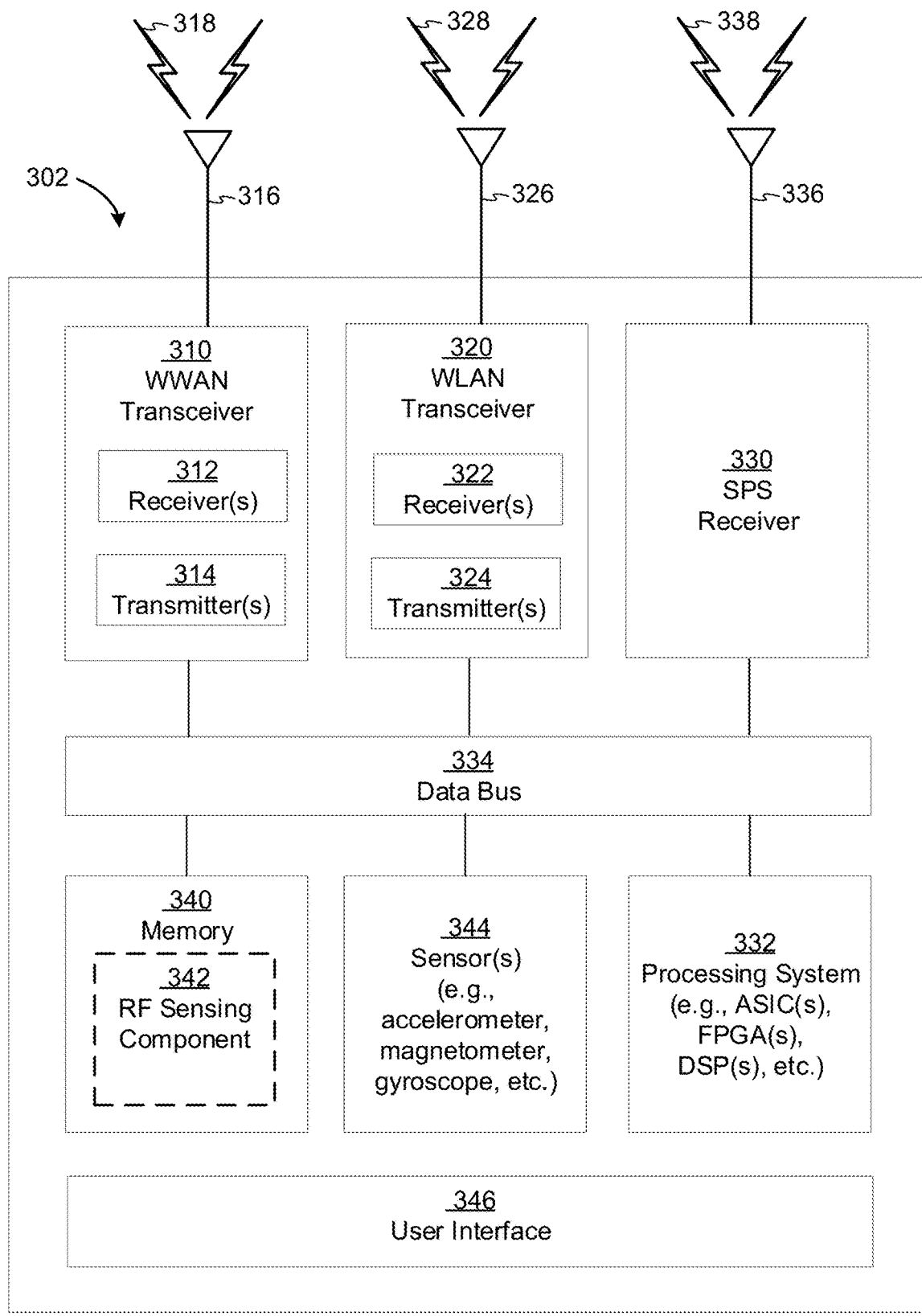
FIGS. 3A to 3C are simplified block diagrams of several sample aspects of components that may be employed in wireless communication nodes and configured to support communication as taught herein.
Figure 3B:
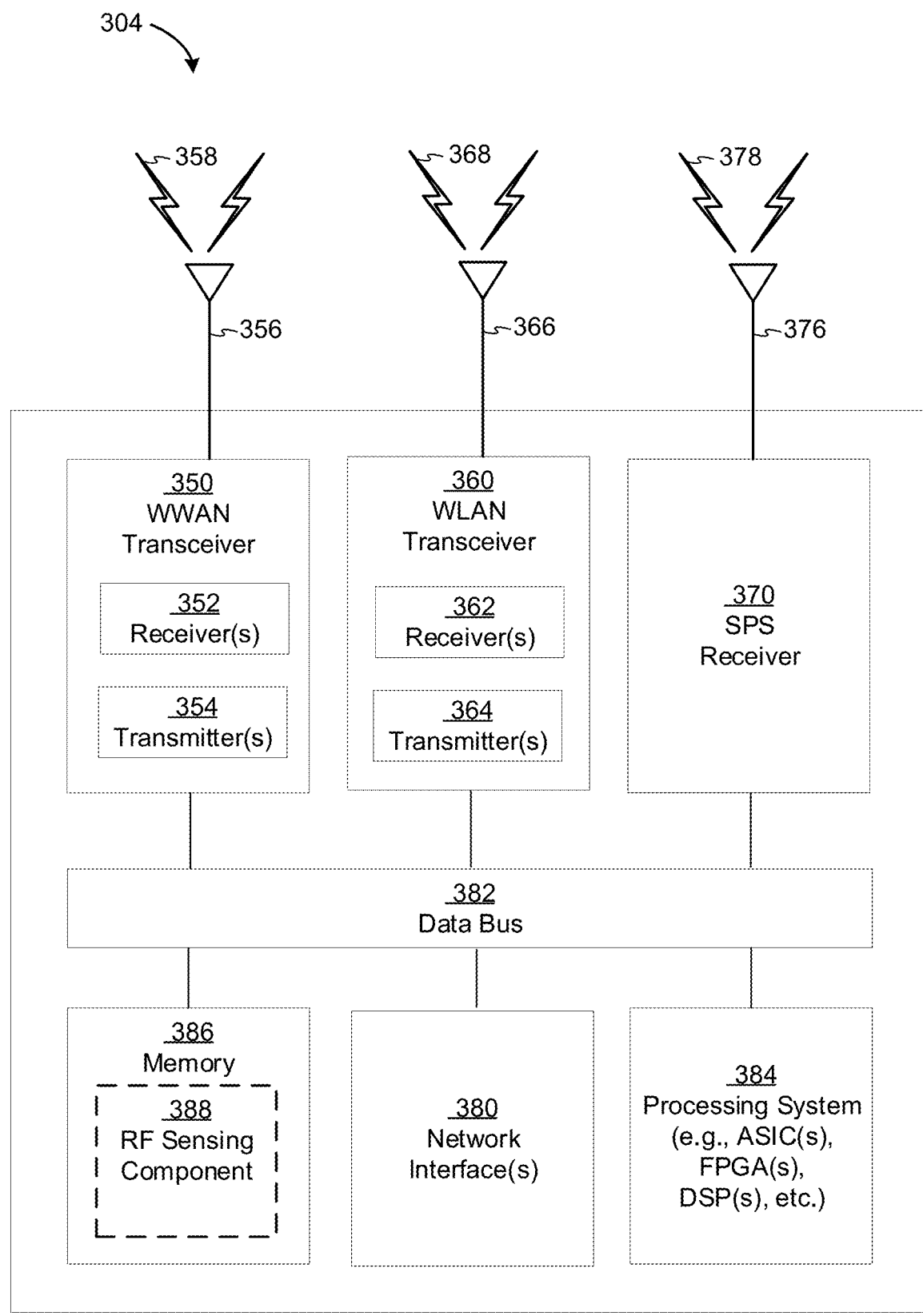
Figure 3C:
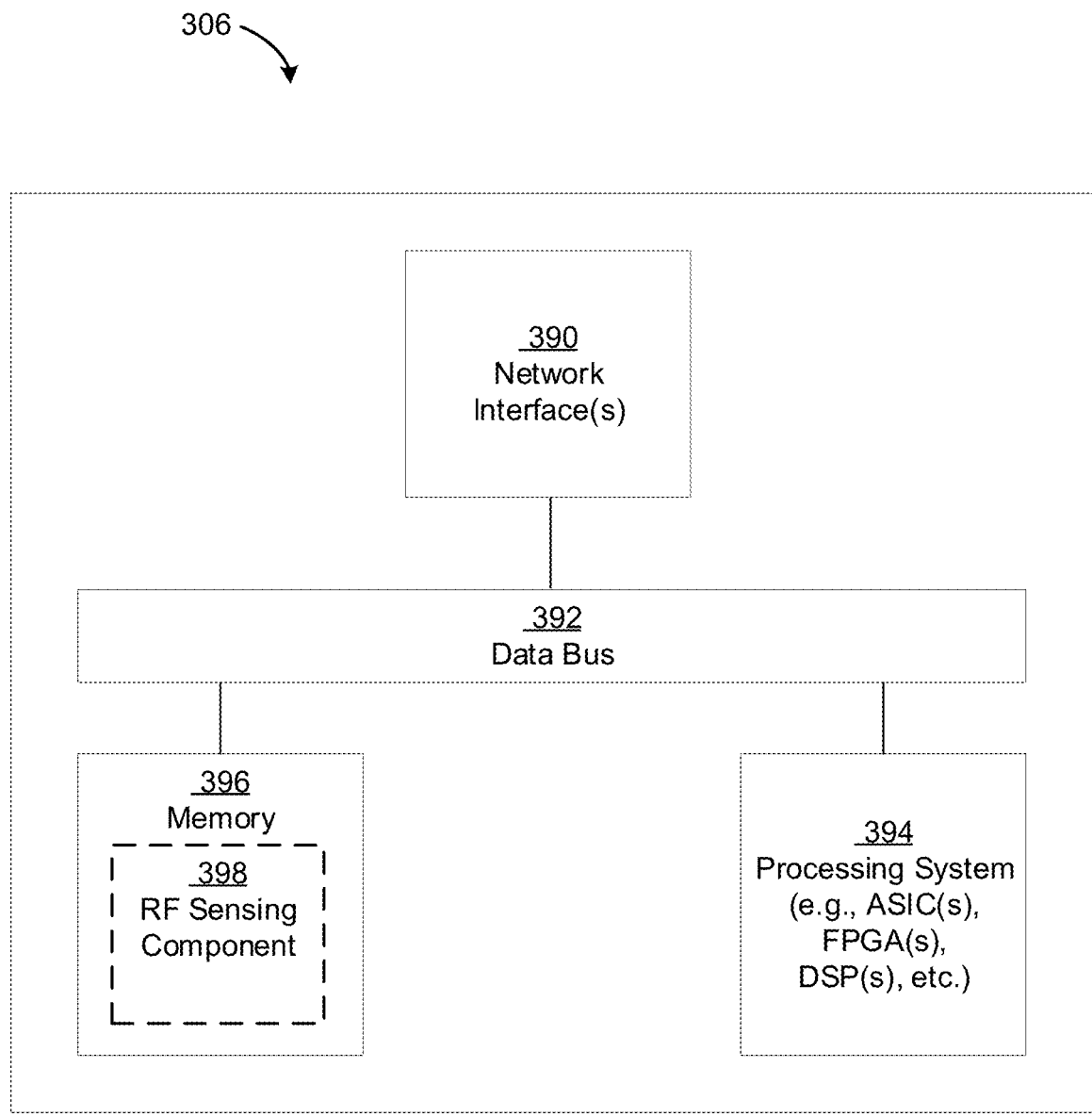

Referring to FIGS. 3A, 3B and 3C, several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations are shown. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, RF sensing, and for providing other processing functionality. The base station 304 includes a processing system 384 for providing functionality relating to, for example, RF sensing as disclosed herein, and for providing other processing functionality. The network entity 306 includes a processing system 394 for providing functionality relating to, for example, RF sensing as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include RF sensing components 342, 388, and 398, respectively. The RF sensing components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the RF sensing components 342, 388, and 398 may be external to the processing systems 332, 384, and 394 (e.g., part of a modem processing system, integrated with another processing system, etc.). Alternatively, the RF sensing components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the RF sensing components 342, 388, and 398, etc.

Wireless communication signals (e.g., RF signals configured to carry OFDM symbols) transmitted between a UE and a base station can be reused for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, etc. As a particular example, the wireless communication signals may be an OFDM waveform as utilized in LTE and NR. High-frequency communication signals, such as mmW RF signals, are especially beneficial to use as radar signals because the higher frequency provides, at least, more accurate range (distance) detection.

Figure 4A:
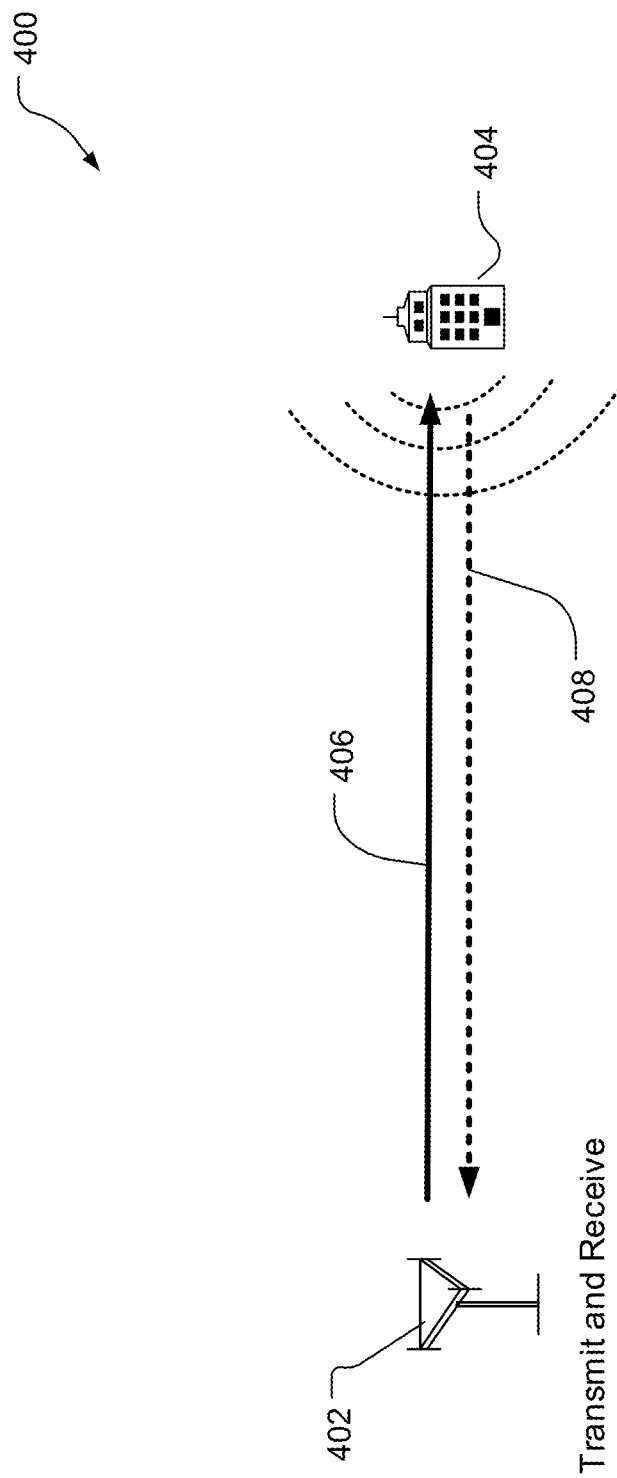
FIG. 4A illustrates an example monostatic radar system.
Figure 4B:
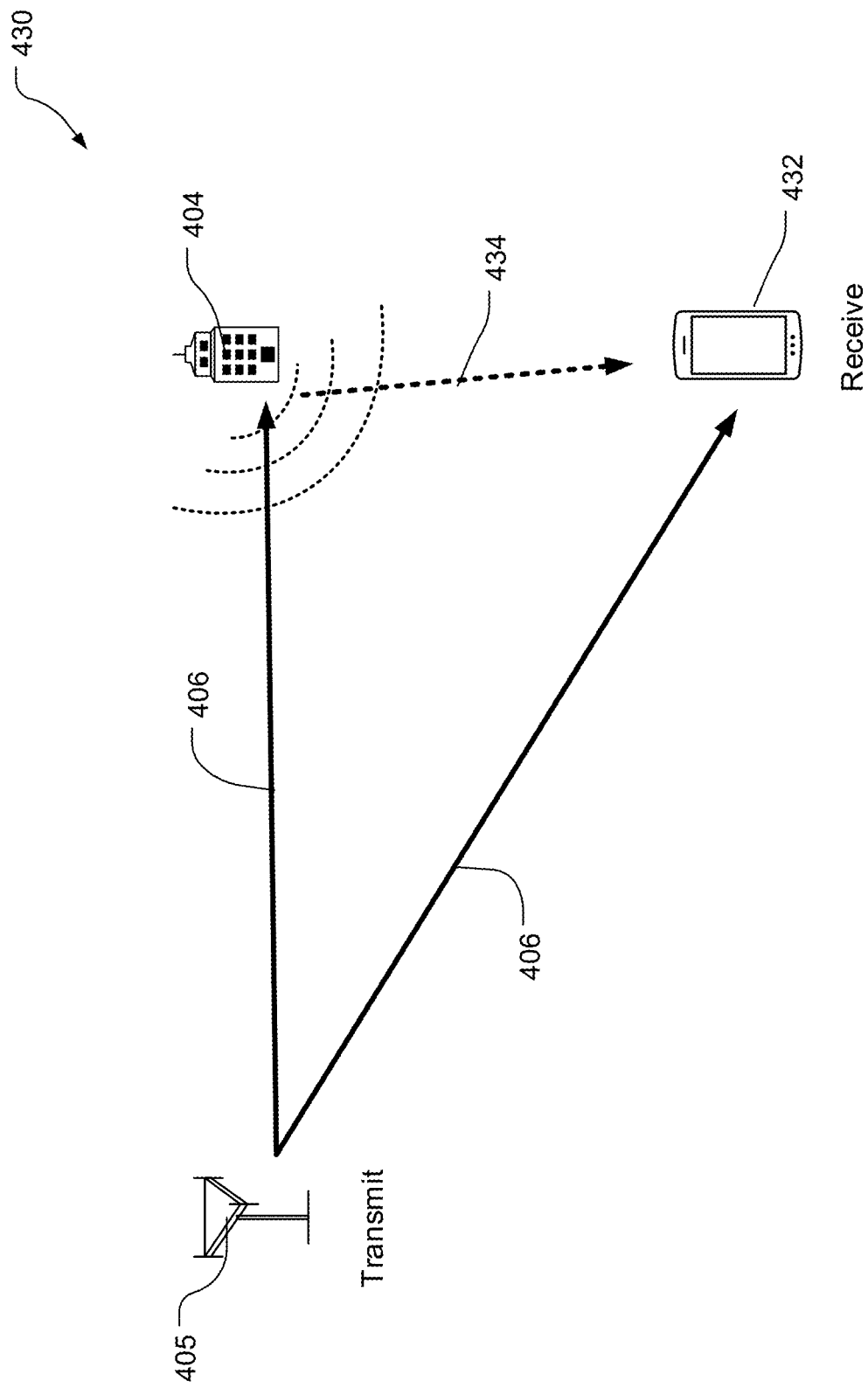
FIG. 4B illustrates an example bistatic radar system.

In general, there are different types of radar, and in particular, monostatic and bistatic radars. FIGS. 4A and 4B illustrate two of these various types of radar. Specifically, FIG. 4A is a diagram 400 illustrating a monostatic radar scenario, and FIG. 4B is a diagram 430 illustrating a bistatic radar scenario. In FIG. 4A, a base station 402 may be configured for full duplex operation and thus the transmitter (Tx) and receiver (Rx) are co-located. For example, a transmitted radio signal 406 may be reflected off of a target object, such as a building 404, and the receiver on the base station 402 is configured to receive and measure a reflected beam 408. This is a typical use case for traditional, or conventional, radar. In FIG. 4B, a base station 405 may be configured as a transmitter (Tx) and a UE 432 may be configured as a receiver (Rx). In this example, the transmitter and the receiver are not co-located, that is, they are separated. The base station 405 may be configured to transmit a beam, such as an omnidirectional downlink RF signal 406 which may be received by the UE 432. A portion of the RF signal 406 may be reflected or refracted by the building 404 and the UE 432 may receive this reflected signal 434. This is the typical use case for wireless communication-based (e.g., WiFi-based, LTE-based, NR-based) RF sensing. Note that while FIG. 4B illustrates using a downlink RF signal 406 as a RF sensing signal, uplink RF signals can also be used as RF sensing signals. In a downlink scenario, as shown, the transmitter is the base station 405 and the receiver is the UE 432, whereas in an uplink scenario, the transmitter is a UE and the receiver is a base station.

Referring to FIG. 4B in greater detail, the base station 405 transmits RF sensing signals (e.g., PRS) to the UE 432, but some of the RF sensing signals reflect off a target object such as the building 404. The UE 404 can measure the ToAs of the RF signal 406 received directly from the base station, and the ToAs of the reflected signal 434 which is reflected from the target object (e.g., the building 404).

The base station 405 may be configured to transmit the single RF signal 406 or multiple RF signals to a receiver (e.g., the UE 432). However, the UE 432 may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 4B, the RF signal 406 follows a LOS path between the base station 405 and the UE 432, and the reflected signal 434 represents the RF sensing signals that followed a NLOS path between the base station 405 and the UE 432 due to reflecting off the building 404 (or another target object). The base station 405 may have transmitted multiple RF sensing signals (not shown in FIG. 4B), some of which followed the LOS path and others of which followed the NLOS path. Alternatively, the base station 405 may have transmitted a single RF sensing signal in a broad enough beam that a portion of the RF sensing signal followed the LOS path and a portion of the RF sensing signal followed the NLOS path.

Based on the difference between the ToA of the LOS path, the ToA of the NLOS path, and the speed of light, the UE 432 can determine the distance to the building 404. In addition, if the UE 432 is capable of receive beamforming, the UE 432 may be able to determine the general direction to the building 404 as the direction of the reflected signal 434, which is the RF sensing signal following the NLOS path as received. The UE 432 may then optionally report this information to the transmitting base station 405, an application server associated with the core network, an external client, a third-party application, or some other entity. Alternatively, the UE 432 may report the ToA measurements to the base station 405, or other entity, and the base station 405 may determine the distance and, optionally, the direction to the target object.

Note that if the RF sensing signals are uplink RF signals transmitted by the UE 432 to the base station 405, the base station 405 would perform object detection based on the uplink RF signals just like the UE 432 does based on the downlink RF signals.

Figure 5:
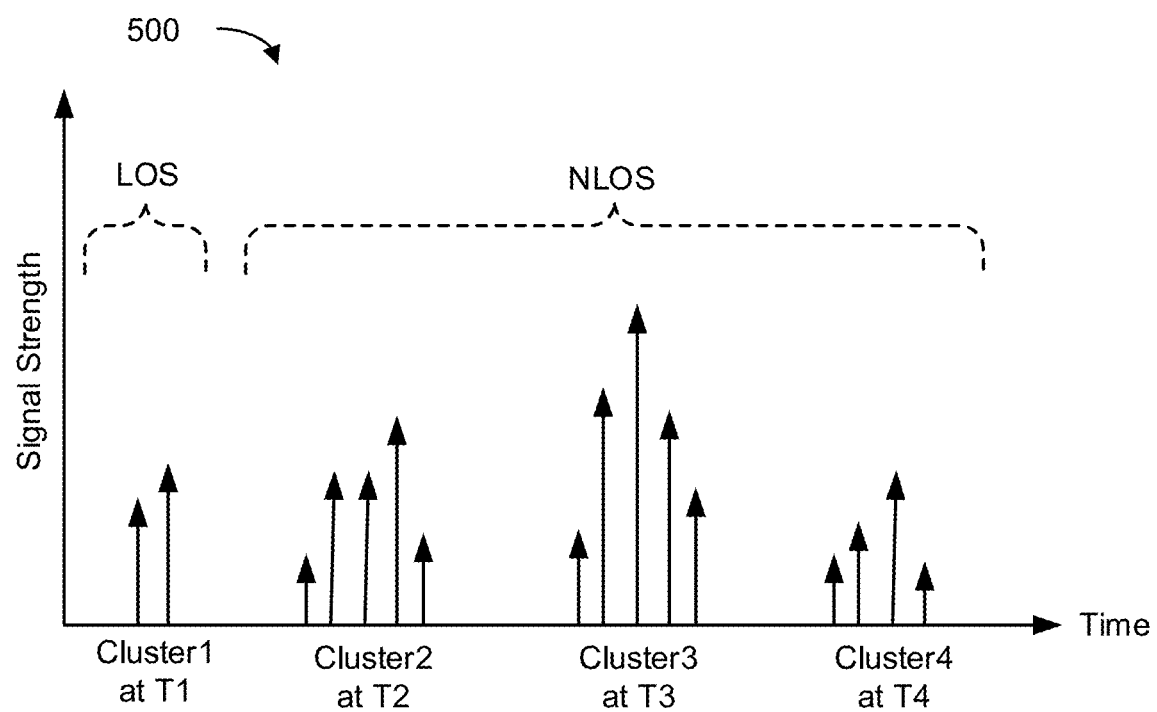
FIG. 5 is an example graph showing a radio frequency (RF) channel response over time.

Referring to FIG. 5, an example graph 500 showing an RF channel response at a receiver (e.g., any of the UEs or base stations described herein) over time is shown. In the example of FIG. 5, the receiver receives multiple (four) clusters of channel taps. Each channel tap represents a multipath that an RF signal followed between the transmitter (e.g., any of the UEs or base stations described herein) and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (potentially following widely different paths due to reflections), or both.

Under the channel illustrated in FIG. 5, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 5, because the first cluster of RF signals at time T1 arrives first, it is presumed to be the LOS data stream (i.e., the data stream arriving over the LOS or the shortest path), and may correspond to the LOS path illustrated in FIG. 4B (e.g., the RF signal 406). The third cluster at time T3 is comprised of the strongest RF signals, and may correspond to the NLOS path illustrated in FIG. 4B (e.g., the reflected signal 434). Note that although FIG. 5 illustrates clusters of two to five channel taps, as will be appreciated, the clusters may have more or fewer than the illustrated number of channel taps.

Figure 6:
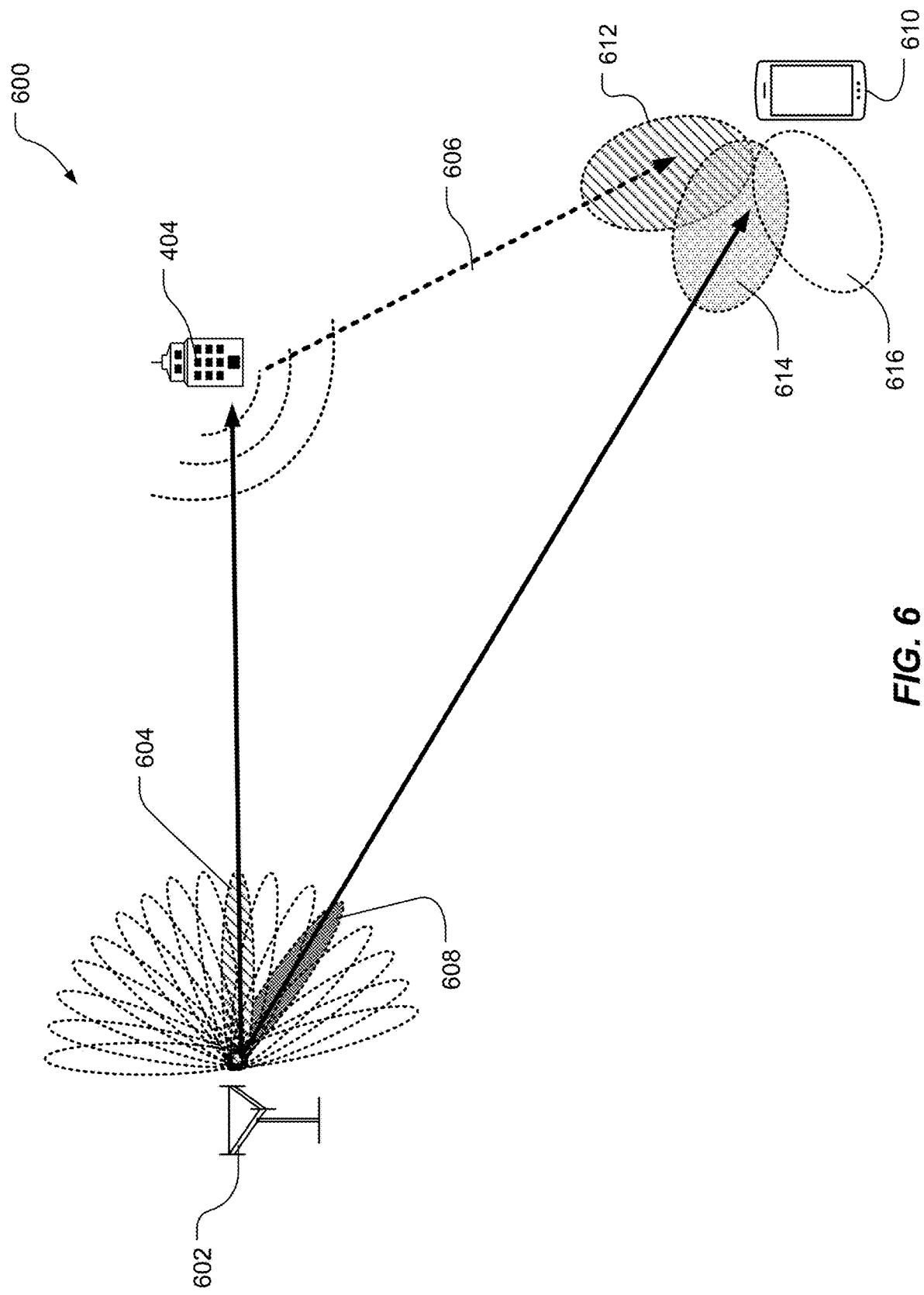
FIG. 6 illustrates an example single target beam management use case for bistatic radio frequency sensing.

Referring to FIG. 6, an example single target beam management use case 600 for bistatic radio frequency sensing is shown. The use case 600 includes a base station 602, such as a 5G NR gNB configured to transmit a plurality of beamformed signals along different azimuths and/or elevations, and a UE 610 configured to utilize receive beamforming to improve the gain of signals based on the angle of arrival. The base station 602 may be configured to generate N different reference beams and various azimuths, elevations, and/or beam widths. In an example the beams transmitted by the base station 602 may be based on SS Blocks, CSI-RS, TRS, or PRS resource sets. Other sensing and tracking reference signals may also be used. The UE 610 may be configured to utilize phase shifters and other software and hardware techniques to generate receive beams such as a first receive beam 612, a second receive beam 614, and a third receive beam 616. The UE 610 may also be configured to utilize beam forming for transmitted beams. The base station 602 may transmit a first reference signal 604 in the direction of a target object, such as the building 404, which may be reflected and the UE 610 may receive a reflected signal 606 with the first receive beam 612. The reflected signal 606 represents a NLOS path of the first reference signal 604 to the UE 610. The base station 602 also transmits a second reference signal 608 on a second beam. In an example, the second reference signal 608 may be quasi co-located (QCLed) with the first reference signal 604. The UE 610 receives the second reference signal 608 with the second receive beam 614. The second reference signal 608 is a LOS path to the UE 610.

In operation, the UE 610 may be configured to report the channel responses for each of the first and second reference signals 604, 608 to the base station 602 or another serving cell, and the base station 602 may be configured to manage the transmit beam and receive beam pairs for object sensing. For example, the base station 602 may be configured to provide transmit and receive beam identification information to the UE 610 to track an object such as the building 404. The beam identification information may be a transmission configuration indicator (TCI) sent in a DCI message which includes configurations such as QCL relationships between the transmit and receive beams.

Figure 7:
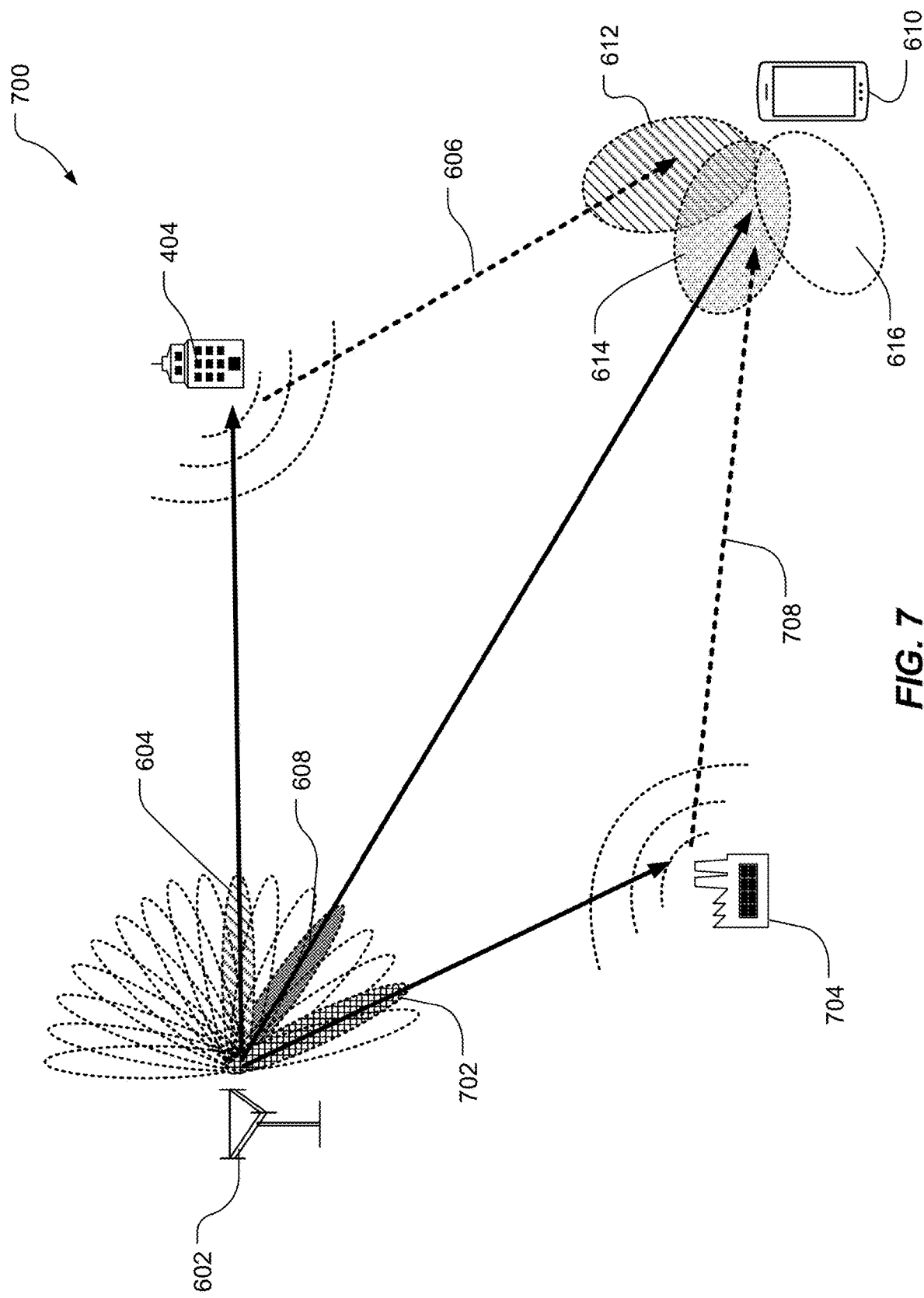
FIG. 7 illustrates an example multi-target beam management use case for bistatic radio frequency sensing.

Referring to FIG. 7, with further reference to FIG. 6, an example multi-target use case 700 for bistatic radio frequency sensing is shown. The use case 700 extends the single target use case 600 of FIG. 6 by including a second target. The second target may be a second building 704 as an example and not a limitation. The number and nature of the targets may vary based on the environment and the radio sensing application. In the use case 700, the base station 602 transmits a third reference signal 702 which is reflected by the second building 704, and the resulting reflected signal 708 is detected by the second receive beam 614 of the UE 610. The UE 610 may report the channel response for the third reference signal 702 with an indication that the measurement was obtained with the second receive beam 614. The base station 602 is configured to manage the beam pairs (i.e., the third reference signal 702, and the second receive beam 614) associated with the second target. Additional targets and the corresponding beam pairs may also be managed by the base station 602. The base station 602 may be configure to track one or more of the targets and thus may provide the corresponding beam pair information to the UE 610 as QCL/TCI for the respective targets.

Figure 8A:
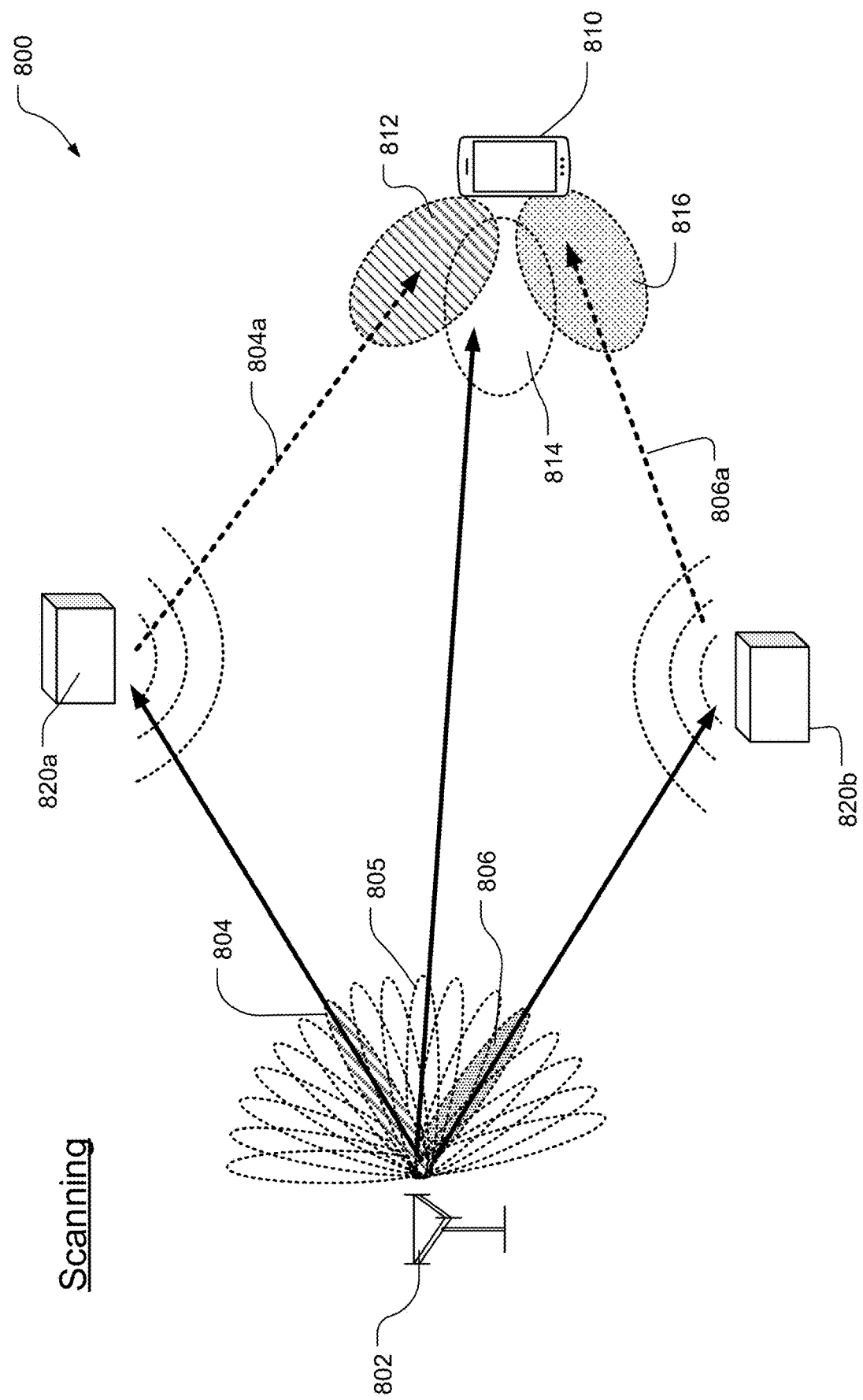
FIG. 8A illustrates an example scanning phase with bistatic radio frequency sensing.

Referring to FIG. 8A, an example scanning phase 800 with bistatic radio frequency sensing is shown. A base station 802 is an example of the base station 304 and is configured to transmit a plurality of beamformed reference signals at varying azimuths, elevations and/or beam widths. The reference signals may be SS Blocks, CSI-RS, TRS, PRS, or a sensing-scanning reference signal (SSRS) configured for RF sensing applications. A UE 810 is an example of the UE 302 and may be configured to perform receive beam scanning along different azimuths, elevation and/or beam widths relative to the orientation of the UE 810. In operation, the base station 802 may transmit one or more of the reference signals in a sequential order (i.e., beam sweeping), and the UE 810 is configured to beam sweep through different receive beams. The scanning phase 800 may be used to initially detect potential objects to be tracked via RF sensing. For example, a first reference signal 804 may be reflected by a first object 820a and a first reflected reference signal 804a may be detected by the UE 810. The UE 810 may cycle through different receive beams, such as a first receive beam 812, a second receive beam 814, and a third receive beam 816. As depicted in FIG. 8A, the first reflected reference signal 804a may be received with the first receive beam 812. The UE 810 may also detect a second reference signal 805 via a LOS path with the second receive beam 814. The beam sweeping on the base station 802 may generate a third reference signal 806 which is reflected on a second object 820b and a third reflected reference signal 806a is received by the UE 810 on the third receive beam 816.

In an embodiment, the UE 810 may be configured to detect a target based on the RSRP of the received signals. For example, the UE 810 may report that the RSRP values associated with the first reference signal 804 and the third reference signal 806 are above a threshold value. The threshold value may be a fixed value, or it may be scaled based on the RSRP of a LOS signal, such as the second reference signal 805. The UE 810 is configured to report one or more channel measurements (e.g., RSRP, RSRQ, SINR) associated with the received reference signals to the base station 802, or other network node. The measurements obtained during the scanning phase 800 may be used for a subsequent tracking phase.

Figure 8B:
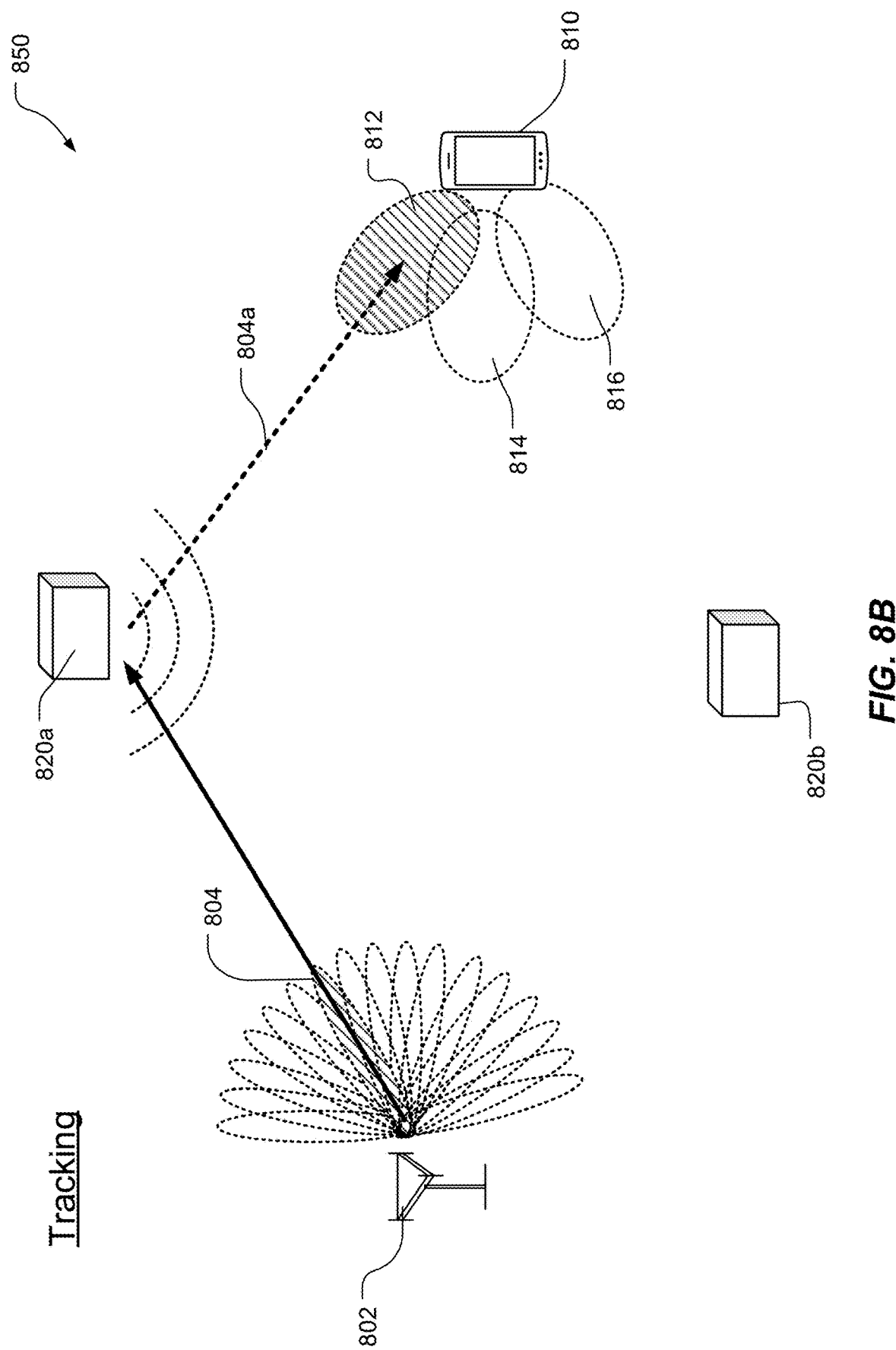
FIG. 8B illustrates an example tracking phase with bistatic radio frequency sensing.

Referring to FIG. 8B, with further reference to FIG. 8A, an example tracking phase 850 with bistatic radio frequency sensing is shown. Continuing the example of FIG. 8A, the base station 802 (or another network node in the communication system 100) may determine to track one or more of the objects detected in the scanning phase 800. For example, the base station 802 may select to track the first object 820a and will send beam configuration information to the UE 810 to enable the UE 810 to track the first object 820a. The beam configuration information may include reference signal information and receive beam configuration information for the UE 810. The base station 802 may utilize a sensing-tracking reference signal (STRS) based on the first reference signal 804 to track or refine the measurements associated with the first object. In an example, the STRS may be QCLed with a corresponding SSRS (i.e., the first reference signal 804). SS Block, CSI-RS, TRS and PRS may be used as STRS. Other reference signals may also be developed and used as the STRS. The beam configuration information sent to the UE 810 may be sent via RRC, Medium Access Control Control Element (MAC-CE), DCI, or other signaling protocols. Upon receipt of the beam configuration information, the UE 810 may for example, use the first receive beam 812 with the STRS to detect the first object 820a.

The base station 802 may be configured to track multiple targets based on the number of reference signals the base station 802 may generate. In an embodiment, the base station 802 may be configured to track one object for each reference signal. For example, the base station 802 may track the second object 820b by generating a second STRS based on the third reference signal 806. The beam configuration information sent to the UE 810 may include the beam parameters for the second STRS and the corresponding receive beam information (e.g., the third receive beam 816) provided by the UE 810 during the scanning phase 800. Thus, the UE 810 may be configured to track both the first object 820a and the second object 820b. Additional objects, up to the number of reference signals generated by the base station 802, may be tracked.

Figure 8C:
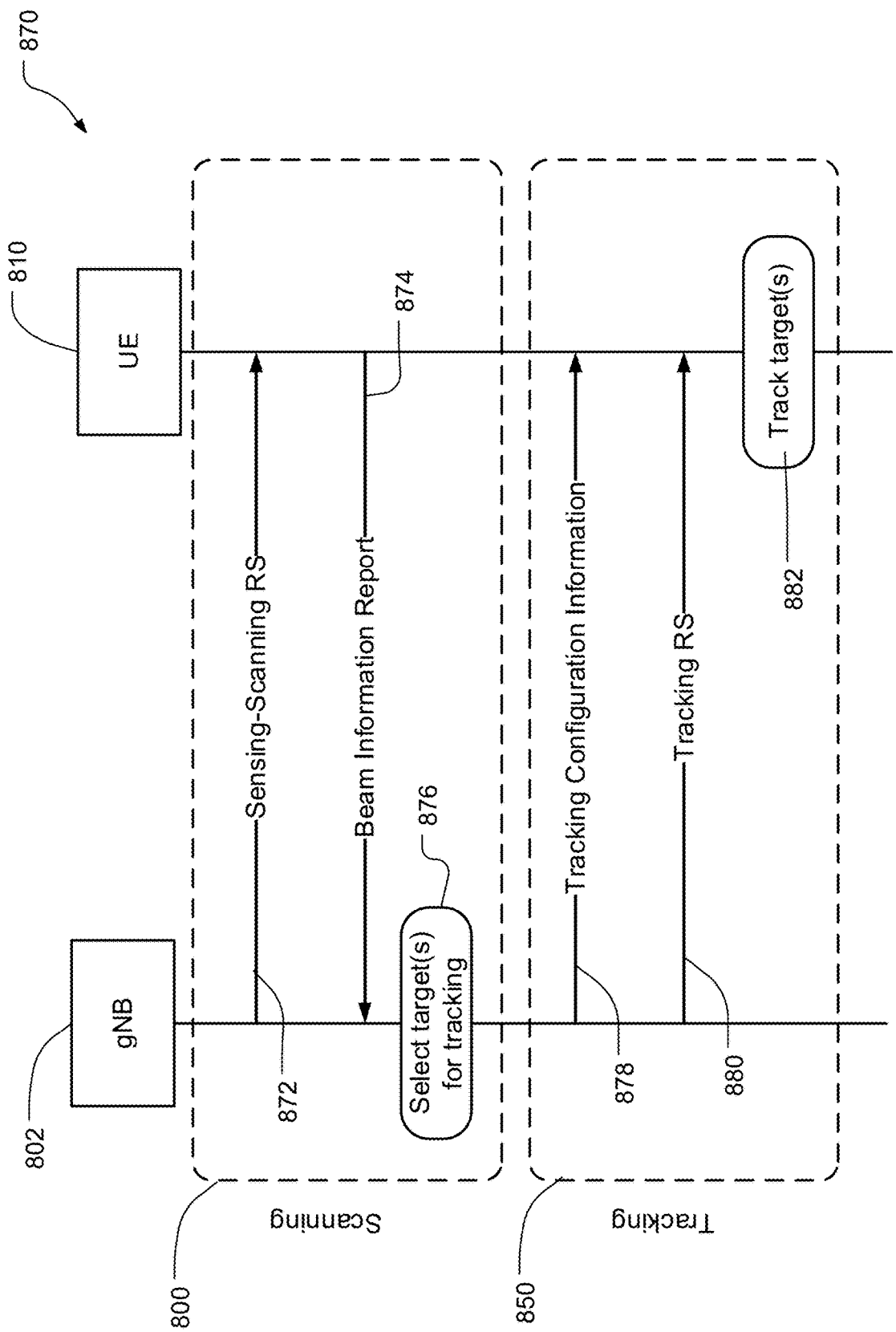
FIG. 8C is an example message flow for beam dependent target tracking with bistatic radio frequency sensing beam management.

Referring to FIG. 8C, with further reference to FIGS. 8A and 8B, an example message flow 870 for beam dependent target tracking with bistatic radio frequency sensing beam management is shown. The message flow 870 represents at least a portion of the signals exchanged between the base station 802 (e.g., a gNB) and the UE 810 during the scanning phase 800 and the tracking phase 850. The base station 802 transmits one or more DL scanning-sensing reference signals (SSRS) 872 such as the first reference signal 804, the second reference signal 805, and the third reference signal 806. The SSRS 872 may be SS Blocks, CSI-RS, TRS, PRS, or other existing or future reference signals configured for channel sounding or specifically for RF sensing measurements. The UE 810 is configured to send a beam information report 874 based on measurements associated with the received SSRS. The beam information report may include, for example, one or more of the RSRP, RSRQ, or SINR values associated with the SSRS which exceed a threshold value. The beam information report 874 may also include receive beam information associated with the SSRSs which exceed the threshold values. The beam information report 874 may be sent via RRC messaging or within other UL signaling.

At stage 876, the base station 802 is configured to select targets for tracking based at least in part on the beam information report 874 sent by the UE 810. The selection of objects for tracking may be based on upper level configuration parameters or other operational considerations. For example, an anticipated loss/degradation of a LOS path with a UE (e.g., due to extreme weather) may cause the network to require tracking of static objects. Further, while the examples in FIGS. 8A-8C depict a single base station and a single UE, additional base stations and UEs may be used to scan for and track objects. The SSRS may be associated with a specific base station and beam (e.g., TRP-ID with PRS-ID), and the network may be configured to aggregate the beam information reports arriving for beams associated with other base stations, and multiple UEs.

In the tracking phase 850, the base station 802 may transmit tracking configuration information 878 for the targets selected at stage 876. The tracking configuration information may include sensing-tracking reference signals (STRS) associated with each of the selected targets. The STRS may be QCLed with the corresponding SSRS 872 transmitted in the scanning phase 800. The tracking configuration information 878 may include receive beam information based on the beam information report 874. The tracking configuration information 878 may be provided via RRC, MAC-CE, DCI, or other network signaling. The tracking configuration information 878 may be specific for the UE 810, or specific for a selected target. The base station 802 transmits DL sensing-tracking reference signals (STRS) 880 based on the targets selected at stage 876. In an example, each target may be associated with a STRS 880. The STRS may be SS Blocks, CSI-RS, TRS, PRS or other current and future reference signals developed for RF sensing applications.

At stage 882, the UE 810 is configured to track the targets associated with the STRS 880. For example, the UE 810 may receive a STRS based on the first reference signal 804 with the first receive beam 812 to detect the first object 820a. If the second object 820b was also selected at stage 876, the UE 810 may be configured to receive a second STRS (which may be QCLed with the third reference signal 806) with the third receive beam 816. In an example, the STRS 880 may be periodic or aperiodic (e.g., event driven).

Figure 9A:
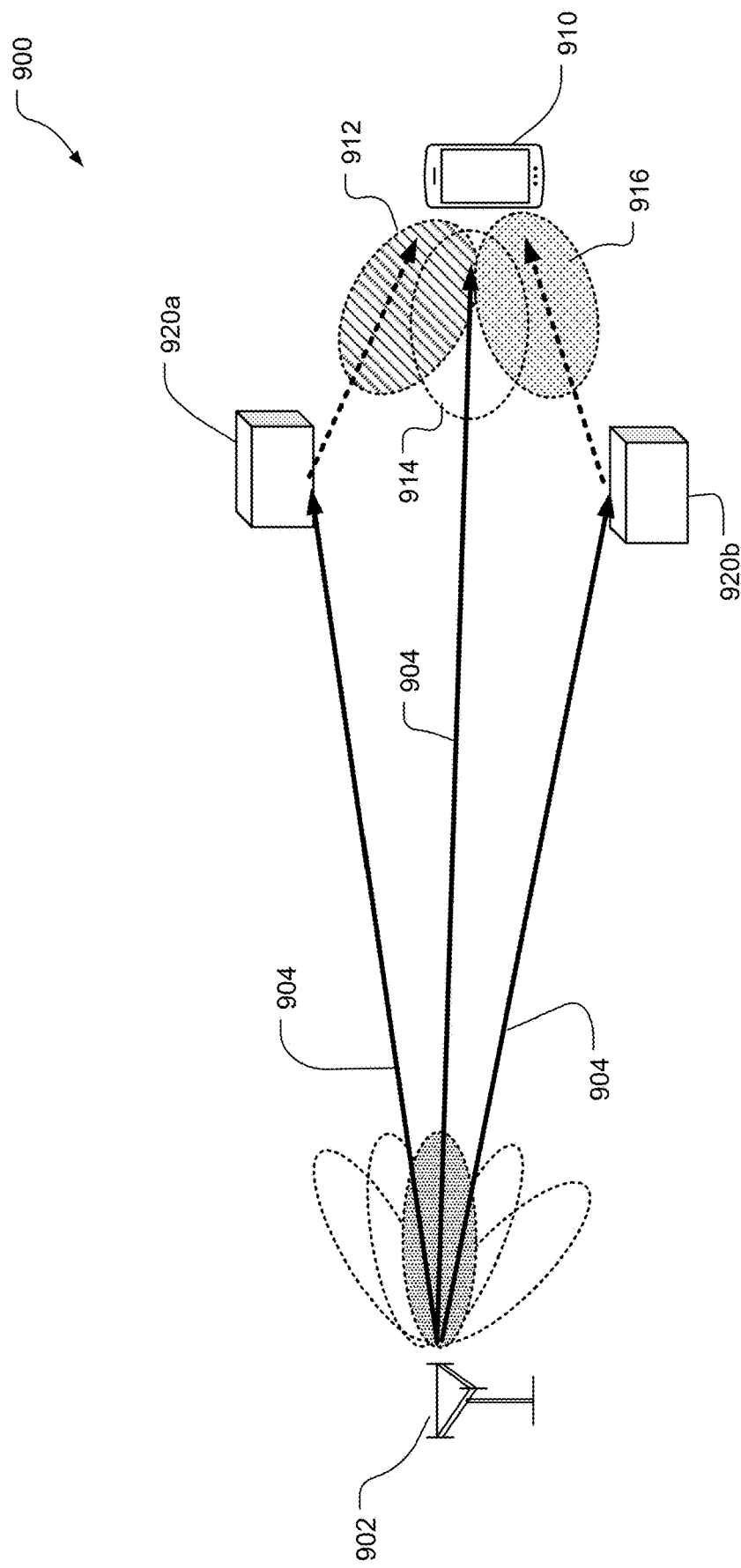
FIG. 9A illustrates an example use case for multi-target detection with bistatic radio frequency sensing.

Referring to FIG. 9A, an example use case 900 for multi-target detection with bistatic radio frequency sensing is shown. In contrast to the examples in FIGS. 8A-8C, where each target may be identified with a single reference signal, the use case 900 highlights scenarios when multiple targets are detected with a single reference signal. For example, a base station 902 is an example of the base station 304 and is configured to transmit a plurality of beamformed reference signals at varying angles, elevations and/or beam widths. A first reference signal 904 may be configured as a SSRS and/or a STRS and is received by a UE 910 via multiple paths. For example, the first reference signal 904 may be reflected from a first target 920a and received by a first receive beam 912. The first reference signal 904 may be received via a LOS path by a second receive beam 914. The first reference signal 904 may also be reflected off of a second target 920b and received via a third receive beam 916. Since the first and second targets 920a-b are associated with the same reference signal, the first reference signal 904 is not sufficient to uniquely identify each target. In this use case, the UE 910 may be configured to assign an explicit target identification to distinguish the targets. The UE 910 may be configured to distinguish the targets based on different receive beams. For example, the RSRP for the first reference signal 904 may exceed a threshold when received on the first receive beam 912, and when received on the third receive beam 916. The UE 910 may assign the first target 920a a first identification (e.g., target 1), and the second target 920b a second identification (e.g., target 2). The target identifications and the corresponding reference signal identification information may be reported to the base station 902.

Figure 9B:
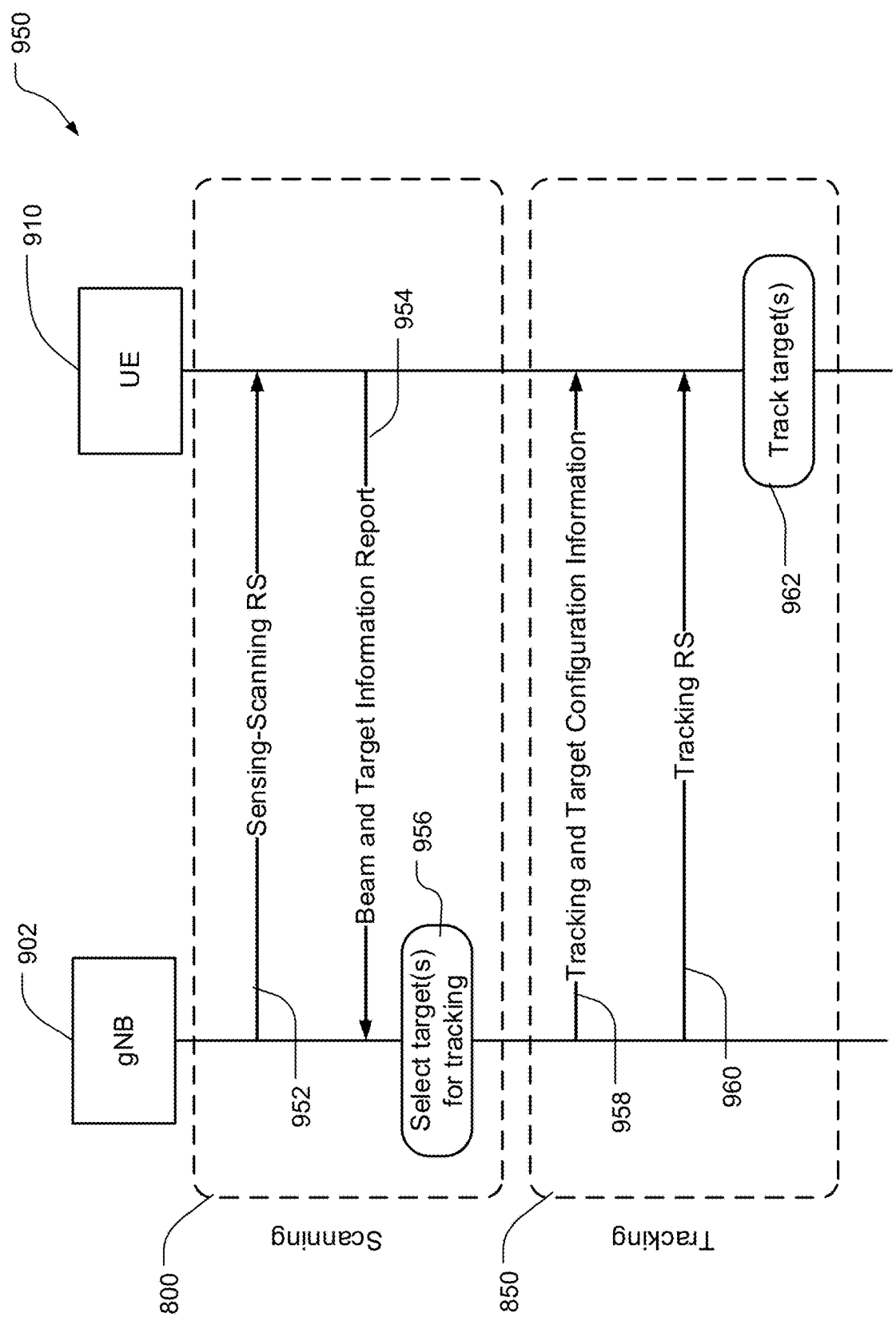
FIG. 9B is an example message flow for multi-target bistatic radio frequency sensing beam management.

Referring to FIG. 9B, with further reference to FIG. 9A, an example message flow 950 for multi-target bistatic radio frequency sensing beam management is shown. The message flow 950 represents at least a portion of the signals exchanged between the base station 902 (e.g., a gNB) and the UE 910 during the scanning phase 800 and the tracking phase 850. The base station 902 transmits one or more DL scanning-sensing reference signals (SSRS) 952 such as the first reference signal 904. The SSRS 952 may be SS Block, CSI-RS, TRS, PRS, or other existing or future reference signals configured for channel sounding or specifically for RF sensing measurements. The UE 910 is configured to send a beam and target information report 954 based on measurements associated with received SSRS. The beam and target information report 954 may include, for example, one or more of the RSRP, RSRQ, or SINR values associated with the SSRS which exceed a threshold value and target identification information if multiple targets are detected. For example, the target information may be generated by the UE 910 based on objects detected by different receive beams, such as the first target 920a as detected by the first receive beam 912, and the second target 920b detected by the third receive beam 916. In an example, the UE 910 may include receive beam identification information in the beam and target information report 954 and the base station 902 may be configured to assign different target identification values based on the receive beam identification information. The beam and target information report 954 may be sent via RRC messaging or within other UL signaling.

At stage 956, the base station 902 is configured to select targets for tracking based at least in part on the beam and target information report 954 sent by the UE 910. The selection of objects for tracking may be based on upper level configuration parameters or other operational considerations. Further, while the example in FIG. 9A depicts a single base station and a single UE, additional base stations and UEs may be used to scan for and track objects. The SSRS may be associated with a specific base station and beam (e.g., TRP-ID with PRS-ID), and the receive beam and/or target identification values may be associated with a reporting UE (e.g., UE identification information). The network may be configured to aggregate the beam and target information reports arriving for beams associated with other base stations, and multiple UEs.

In the tracking phase 850, the base station 902 may transmit tracking and target configuration information 958 for the targets selected at stage 956. The tracking and target configuration information 958 may include the sensing-tracking reference signal (STRS) associated with the selected targets. The STRS may be QCLed with the corresponding SSRS 952 transmitted in the scanning phase 800. The tracking and target configuration information 958 may include the target identification information based on the beam and target information report 954. The tracking and target configuration information 958 may be provided via RRC, MAC-CE, DCI, or other network signaling. The tracking and target configuration information 958 may be specific for the UE 910, or specific for one or more of the selected targets. The base station 902 transmits DL sensing-tracking reference signals (STRS) 960 based on the targets selected at stage 956. The STRS 960 may be SS Blocks, CSI-RS, TRS, PRS or other current and future reference signals developed for RF sensing applications.

At stage 962, the UE 910 is configured to track the targets associated with the STRS 960. For example, the UE 910 may receive a STRS based on the first reference signal 904 to detect the first target 920a and/or the second target 920b. In an example, the STRS 960 may be periodic or aperiodic (e.g., event driven).

Figure 10A:
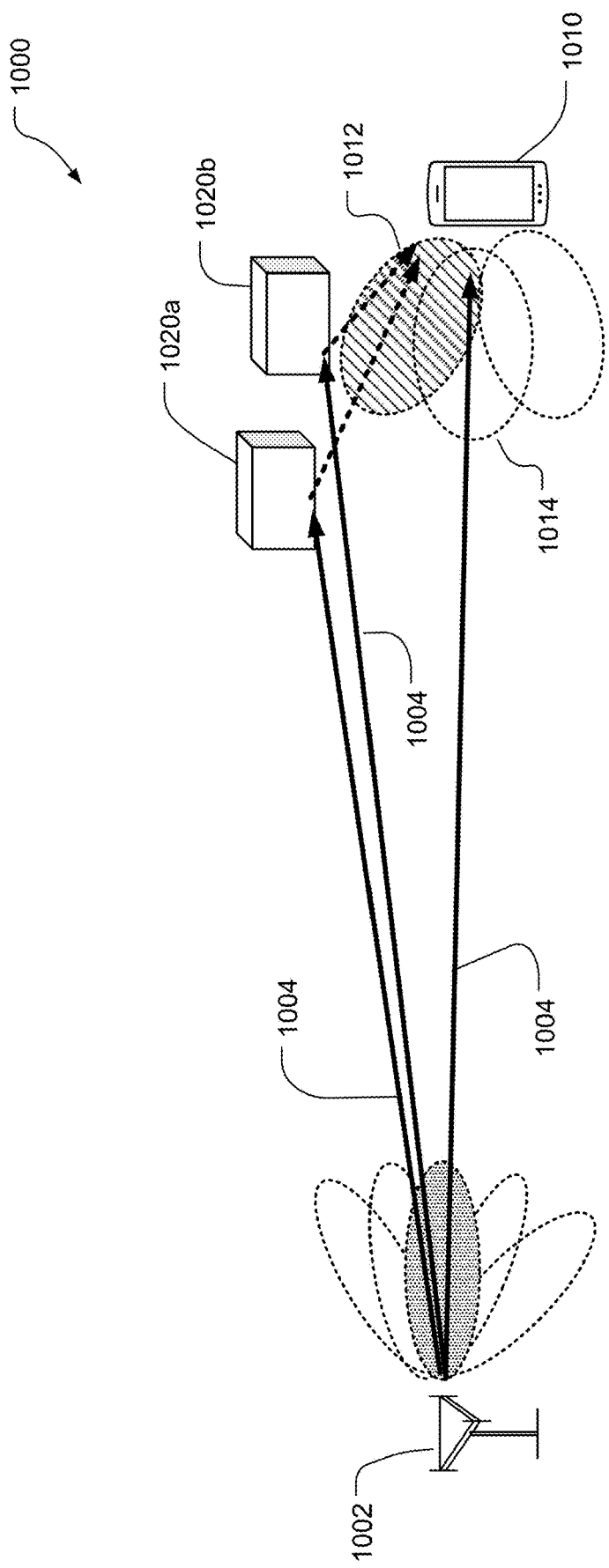
FIG. 10A illustrates an example use case for a target group detection with bistatic radio frequency sensing.

Referring to FIG. 10A, an example use case 1000 for target group detection with bistatic radio frequency sensing is shown. In contrast to the examples in FIGS. 8A-8C, where each target may be identified with a single reference signal, and the use case in FIG. 9A, where each target may be identified by different receive beams, the use case 1000 highlights scenarios when multiple targets are detected with a single reference signal and a single receive beam. For example, a base station 1002 is an example of the base station 304 and is configured to transmit a plurality of beamformed reference signals at varying angles, elevations and/or beam widths. A first reference signal 1004 may be configured as a SSRS and/or a STRS and is received by a UE 1010 via multiple paths. For example, the first reference signal 1004 may be reflected from a first target 1020a and from a second target 1020b and received by a first receive beam 1012. The first reference signal 1004 may also be received via a LOS path by a second receive beam 1014. Since the first and second targets 1020a-b are associated with the same reference signal and the same receive beam, the combination of first reference signal 1004 and the first receive beam 1012 is insufficient to uniquely identify each of the targets 1020a-b. In this use case, the UE 1010 may be configured to assign an target group identification to identify the first and second targets 1020a-b as a target group. The RSRP for the first reference signal 1004 may exceed a threshold when received on the first receive beam 1012. In an example, the UE 1010 may be configured to resolve a target group into separate targets based on the clusters and channel taps. The UE 1010 may assign a target group identification for the first target 1020a and the second target 1020b (e.g., target group 1). The target group identifications and the corresponding reference signal identification information may be reported to the base station 1002.

Figure 10B:
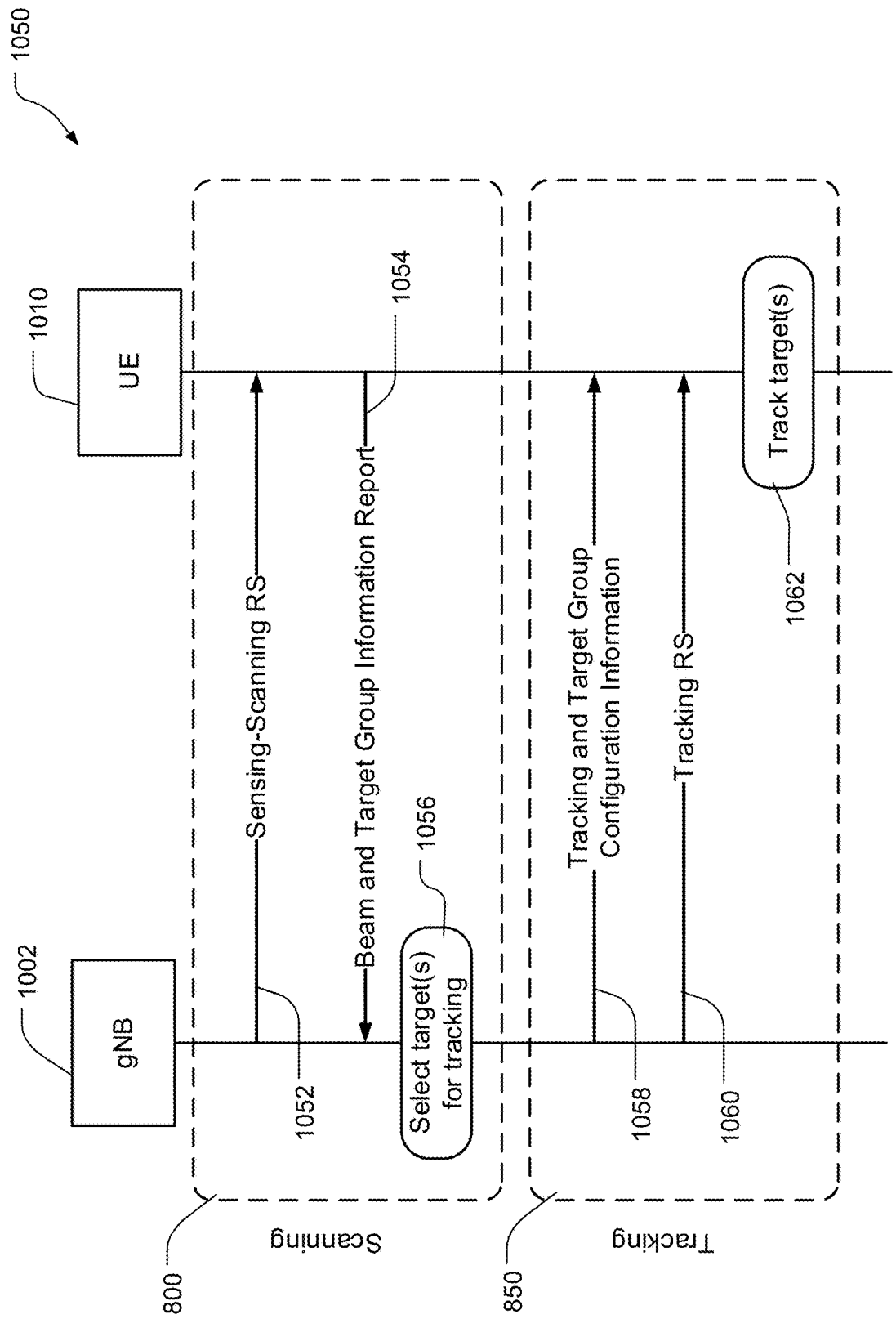
FIG. 10B is an example message flow for target group bistatic radio frequency sensing beam management.

Referring to FIG. 10B, with further reference to FIG. 10A, an example message flow 1050 for target group bistatic radio frequency sensing beam management is shown. The message flow 1050 represents at least a portion of the signals exchanged between the base station 1002 (e.g., a gNB) and the UE 1010 during the scanning phase 800 and the tracking phase 850. The base station 1002 transmits one or more DL scanning-sensing reference signals (SSRS) 1052 such as the first reference signal 1004. The SSRS 1052 may be SS Block, CSI-RS, TRS, PRS, or other existing or future reference signals as previously described. The UE 1010 is configured to send a beam and target group information report 1054 based on measurements associated with received SSRS. The beam and target group information report 1054 may include, for example, one or more of the RSRP, RSRQ, or SINR values associated with the SSRS which exceed a threshold value and target group identification information. For example, the target group information may be generated by the UE 1010 based on objects detected by a single receive beam, such as the first and second targets 1020a-b as detected by the first receive beam 1012. In an example, the UE 1010 may include receive beam identification information in the beam and target group information report 1054 and the base station 1002 may be configured to assign different target group identification values based on the receive beam identification information. The beam and target group information report 1054 may be sent via RRC messaging or within other UL signaling.

At stage 1056, the base station 1002 is configured to select targets for tracking based at least in part on the beam and target group information report 1054 sent by the UE 1010. The selection of objects for tracking may be based on upper level configuration parameters or other operational considerations. Further, while the example in FIG. 10A depicts a single base station and a single UE, additional base stations and UEs may be used to scan for and track target groups. The SSRS may be associated with a specific base station and beam (e.g., TRP-ID with PRS-ID), and the receive beam and/or target group identification values may be associated with a reporting UE (e.g., UE identification information). The network may be configured to aggregate the beam and target group information reports arriving for beams associated with other base stations, and multiple UEs.

In the tracking phase 850, the base station 1002 may transmit tracking and target group configuration information 1058 for the targets selected at stage 1056. The tracking and target group configuration information 1058 may include the sensing-tracking reference signal (STRS) associated with the selected targets. The STRS may be QCLed with the corresponding SSRS 1052 transmitted in the scanning phase 800. The tracking and target group configuration information 1058 may include the target group identification information based on the beam and target group information report 1054. The tracking and target group configuration information 1058 may be provided via RRC, MAC-CE, DCI, or other network signaling. The tracking and target group configuration information 1058 may be specific for the UE 1010, or specific for one or more of selected target groups. The base station 1002 transmits DL sensing-tracking reference signals (STRS) based on the targets or target groups selected at stage 1056. The STRS 1060 may be SS Blocks, CSI-RS, TRS, PRS or other current and future reference signals developed for RF sensing applications.

At stage 1062, the UE 1010 is configured to track the target groups associated with the STRS 1060. For example, the UE 1010 may receive a STRS based on the first reference signal 1004 to detect a target group including the first target 1020a and the second target 1020b. In an example, the STRS 1060 may be periodic or aperiodic (e.g., event driven).

Figure 11A:
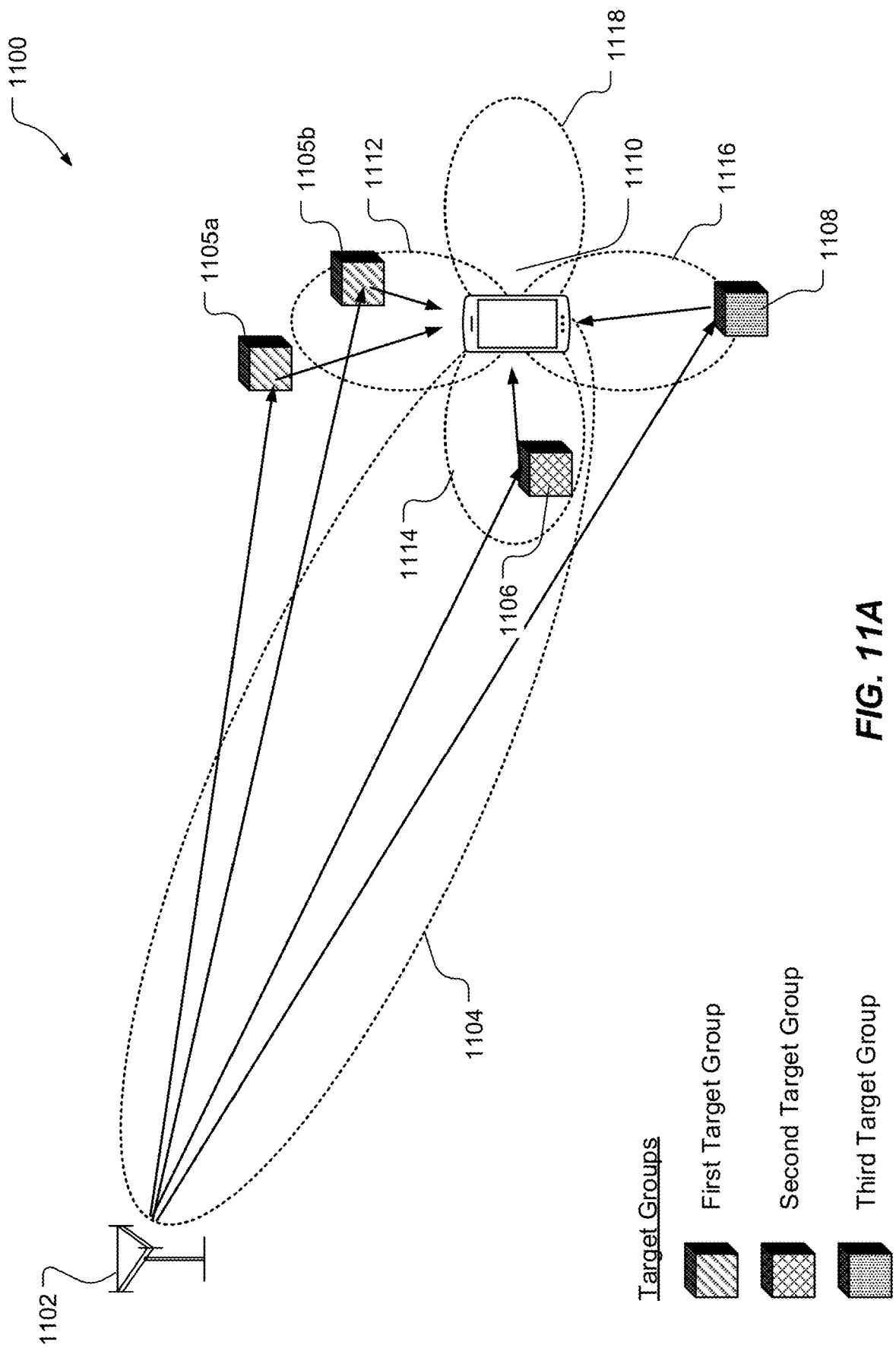
FIG. 11A illustrates an example use case of single sided beam management for bistatic radio frequency sensing.

Referring to FIG. 11A, an example use case 1100 for single sided beam management for bistatic radio frequency sensing is shown. In contrast to the examples in FIGS. 8A-8C, where each target may be identified with a single reference signal, the use case 1100 highlights scenarios when multiple target groups are detected with a single reference signal. For example, a base station 1102 is an example of the base station 304 and is configured to transmit a plurality of beamformed reference signals at varying angles, elevations and/or beam widths. A first reference signal 1104 may be configured as a SSRS and/or a STRS and is received by a UE 1110 via multiple paths. For example, the first reference signal 1104 may be reflected from a first target 1105a and a second target 1105b and received by a first receive beam 1112. The first reference signal 1104 may be received by a second receive beam 1114 via a LOS path and via a NLOS path including a reflection from a third target 1106. The first reference signal 1104 may also be reflected off of a fourth target 1108 and received via a third receive beam 1116. Since all of the targets in FIG. 11A are associated with the same reference signal (i.e., the first reference signal 1104), the first reference signal 1104 is not sufficient to uniquely identify each target. In this use case, the UE 1110 may be configured to assign explicit target group identifications to distinguish between target groups. In an embodiment, the target groups may be based on the receive beams 1112, 1114, 1116. For example, a first target group includes the first target 1105a and the second target 1105b, a second target group includes the third target 1106, and a third target group includes the fourth target 1108. The relative locations and number of objects in the target groups are examples only and not limitations. The UE 1110 may utilize wider or narrow receive beams and may be configured to distinguish the targets based on different receive beams and the corresponding reference signal measurements. For example, the RSRP for the first reference signal 1104 may exceed a threshold when received on the first receive beam 1112, the second receive beam 1114, and the third receive beam 1116. As depicted in FIG. 11A, the first reference signal 1104 is not detected (or the RSRP is below a threshold value) on a fourth receive beam 1118. The UE 1110 may assign the first target 1105a and the second target 1105b a first target group identification (e.g., target group 1), the target 1106 a second target group identification (e.g., target group 2), and the fourth target 1108 a third target group identification (e.g., target group 3). The target group identifications and the corresponding reference signal identification information may be reported to the base station 1102. In an embodiment, the UE 1110 may be configured to provide the RSRP values and an indication of the corresponding receive beam to the base station 1102, and the base station 1102 (or other network node) may be configured to assign the target group identifications.

Figure 11B:
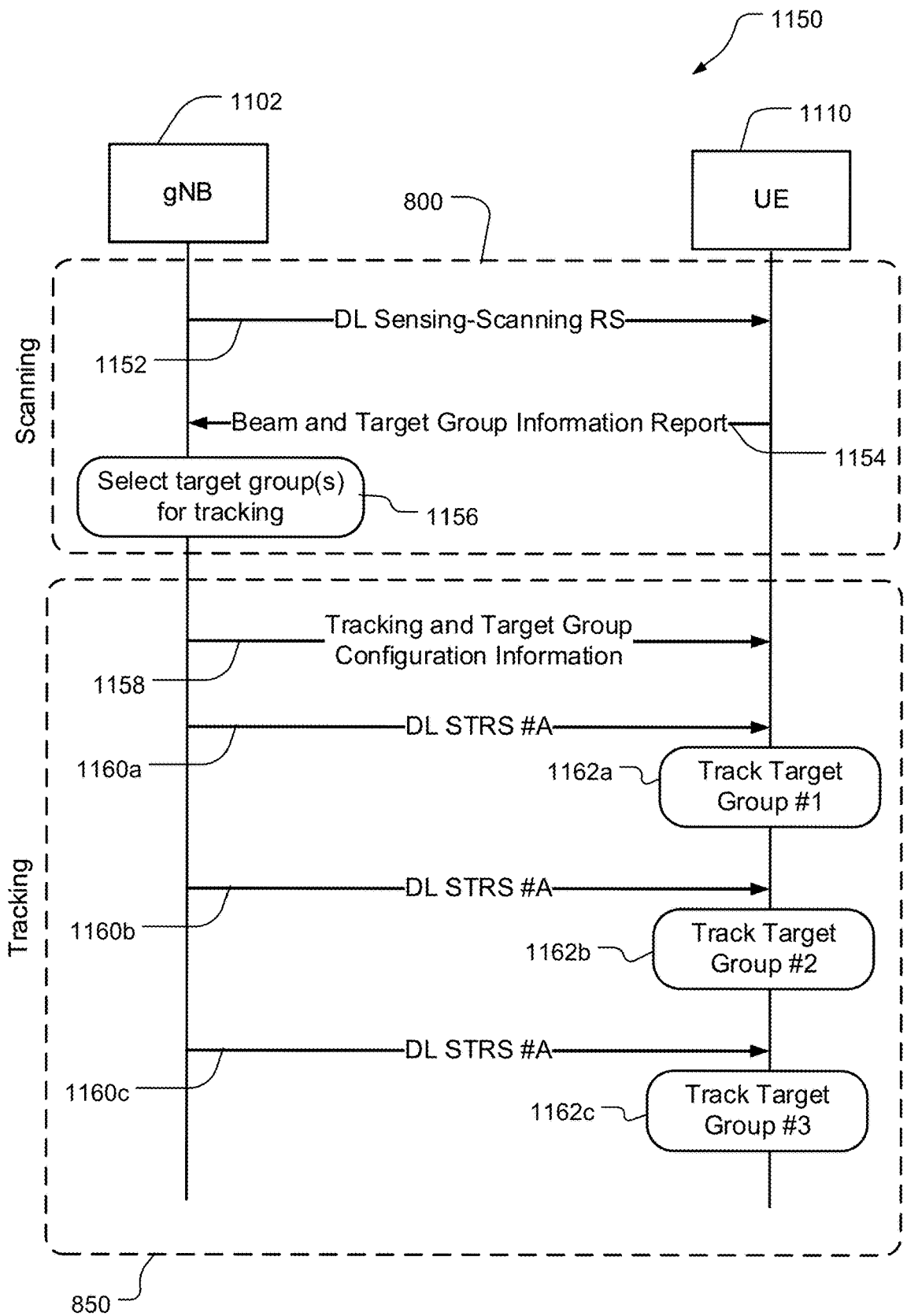
FIG. 11B is an example message flow for single sided bistatic radio frequency sensing beam management.

Referring to FIG. 11B, with further reference to FIG. 11A, an example message flow 1150 for single sided bistatic radio frequency sensing beam management is shown. The message flow 1150 represents at least a portion of the signals exchanged between the base station 1102 (e.g., a gNB) and the UE 1110 during the scanning phase 800 and the tracking phase 850. The base station 1102 transmits one or more DL scanning-sensing reference signals (DL SSRS) 1152 such as the first reference signal 1104. The DL SSRS 1152 may be SS Block, CSI-RS, TRS, PRS, or other existing or future reference signals configured for channel sounding or specifically for RF sensing measurements. The UE 1110 is configured to send a beam and target group information report 1154 based on measurements associated with a received DL SSRS. The beam and target group information report 1154 may include, for example, one or more of the RSRP, RSRQ, or SINR values associated with the DL SSRS which exceed a threshold value. The beam and target group information report 1154 may also include multiple target group identification values if multiple target groups are detected. For example, the target group identification values may be generated by the UE 1110 based on objects detected by different receive beams, such as the first target group including the first and second targets 1105a-b as detected by the first receive beam 1112, the second target group including the third target 1106 detected by the second receive beam 1114, and the third target group including the fourth target 1108 detected by the third receive beam 1116. In an example, the UE 1110 may include the receive beam identification information in the beam and target group information report 1154. The base station 1102 may be configured to assign different target group identification values based on the receive beam identification information. The beam and target group information report 1154 may be sent via RRC messaging or within other UL signaling.

At stage 1156, the base station 1102 is configured to select one or more target groups for tracking based at least in part on the beam and target group information report 1154 sent by the UE 1110. The selection of target groups for tracking may be based on upper level configuration parameters or other operational considerations. Further, while the example in FIG. 11A depicts a single base station and a single UE, additional base stations and UEs may be used to scan for and track objects. The SSRS may be associated with a specific base station and beam (e.g., TRP-ID with PRS-ID), and the receive beam and/or target group identification values may be associated with a reporting UE (e.g., UE identification information). The network may be configured to aggregate the beam and target group information reports arriving for beams associated with other base stations, and multiple UEs.

In the tracking phase 850, the base station 1102 may transmit tracking and target group configuration information 1158 for the target groups selected at stage 1156. The tracking and target group configuration information 1158 may include the sensing-tracking reference signal (STRS) associated with the selected target groups. The STRS may be QCLed with the corresponding SSRS transmitted in the scanning phase 800. The tracking and target group configuration information 1158 may include the target group identification information based on the beam and target group information report 1154. The tracking and target group configuration information 1158 may be provided via RRC, MAC-CE, DCI, or other network signaling. The tracking and target group configuration information 1158 may be specific for the UE 1110, or specific for one or more of the selected target groups. In operation, when multiple target groups are associated with a signal STRS (e.g., STRS #A depicted in FIG. 11B), the tracking and target group configuration information 1158 indicates that the STRS is repeated a number of times equal to the number of target groups to be tracked. The tracking and target group configuration information 1158 may also include the repetition pattern (e.g., period, time offset, interval, etc.) for the repeating STRS and the corresponding target group identifications for the target groups to be tracked.

The base station 1102 is configured to transmit DL sensing-tracking reference signals (STRS) based on the target groups selected at stage 1156 and the repetition pattern in the tracking and target group configuration information 1158. For example, a first transmission 1160a of the DL STRS #A enables the UE 1110 to track the first target group at stage 1162a, a second transmission 1160b of the DL STRS #A enables the UE 1110 to track the second target group at stage 1162b, and a third transmission 1160c enables the UE 1110 to track the third target group. The STRSs 1160a-c may be SS Blocks, CSI-RS, TRS, PRS or other current and future reference signals developed for RF sensing applications. The tracking at stages 1162a-c may include obtaining one or more reference signal measurements such as RSRP, RSRQ, or SINR values associated with the DL STRS. The STRSs 1160a-c may be QCLed with the SSRS 1152, which is the bases for the beam and target group information report 1154. In an example, the STRSs 1160a-c may be event driven based on a tracking request received from the UE 1110 or another network node.

Figure 12:
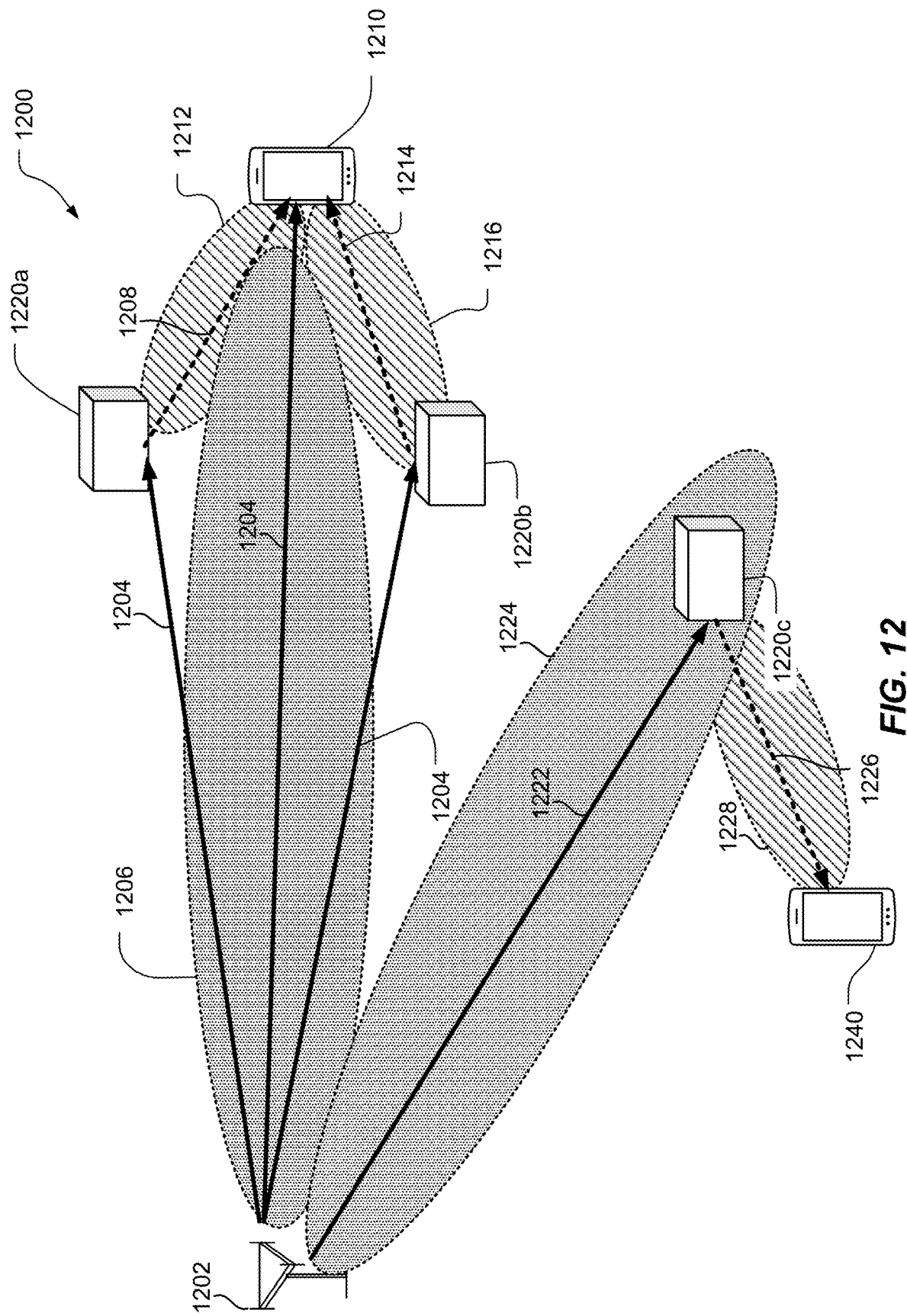
FIG. 12 illustrates a multi-UE tracking case in accordance with an aspect of the disclosure.

FIG. 12 illustrates a multi-UE tracking case 1200 in accordance with an aspect of the disclosure. Referring to FIG. 12, a BS 1202 is an example of the BS 304, and is configured to transmit a plurality of beamformed reference signals at varying angles, elevations and/or beam widths. A first reference signal 1204 may be configured as a SSRS and/or a STRS and may be transmitted over a first transmission beam 1206, and is received by a UE 1210 ("UE A") via multiple paths. For example, the first reference signal 1204 may be reflected (or deflected) from a first target 1220a ("A-1") and received via a deflected signal 1208 on a first receive beam 1212. The first reference signal 1204 may further be reflected (or deflected) from a second target 1220b ("A-2") and received via a deflected signal 1214 on a second receive beam 1216.

Referring to FIG. 12, a second reference signal 1222 may be configured as a SSRS and/or a STRS and may be transmitted over a second transmission beam 1224, and is received by a UE 1240 ("UE B") via at least one path. For example, the second reference signal 1222 may be reflected (or deflected) from a third target 1220c ("B-1") and received via a deflected signal 1226 on a receive beam 1228.

Figure 13:
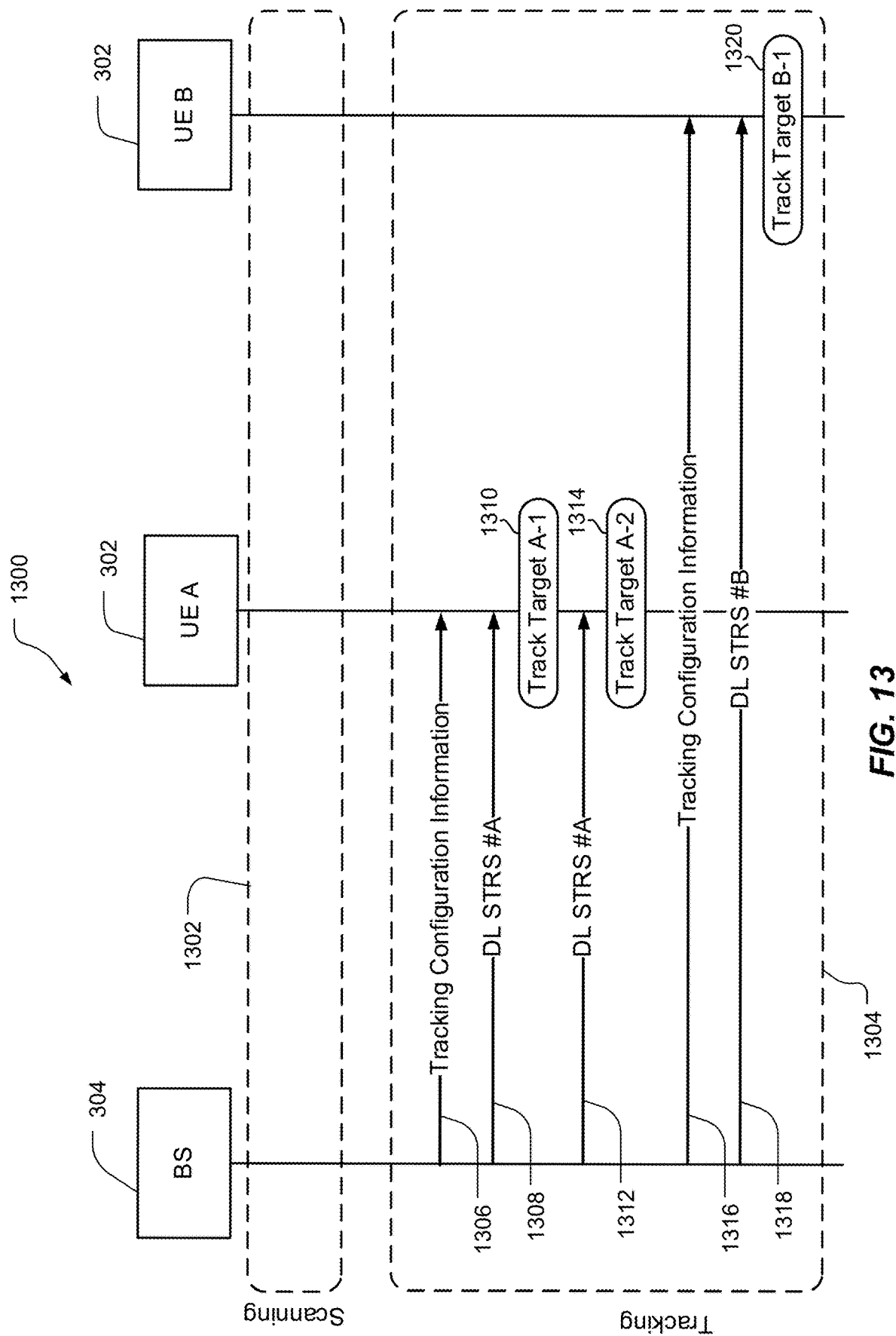
FIG. 13 illustrates a bistatic radio frequency sensing beam management process 1300 in accordance with an aspect of the disclosure.

FIG. 13 illustrates a bistatic radio frequency sensing beam management process 1300 in accordance with an aspect of the disclosure. The process 1300 of FIG. 13 is a multi-user (or multi-UE) procedure, whereby a BS configured as BS 304 performs bistatic radio frequency sensing beam management on behalf of UEs A and B, each of which may be configured as UE 302. For example, UE A may correspond to UE 1210 from FIG. 12, and UE B may correspond to UE 1240 from FIG. 12. As noted above with respect to FIG. 12, the targets 1220a-1220c (or A-1, A-2 and B-1, respectively) are each distinct targets (or distinct target groups).

Referring to FIG. 13, a scanning phase 1302 is performed, the details of which are omitted and which may correspond to any of the scanning phases described above in any combination (e.g., 800 of FIG. 8C, etc.). As a result of the scanning phase 1302, assume that targets A-1, A-2 and B-1 are identified to BS 304 and are selected for tracking. Below, A-1, A-2 and B-1 are described as targets, although it will be appreciated that any of A-1, A-2 and B-1 could alternatively correspond to target groups as described above with respect to FIGS. 9A-11B.

Referring to FIG. 13, a tracking phase 1304 is performed after the scanning phase 1302. At 1306, BS 304 transmits tracking configuration information for target A-1 and A-2 to UE A via unicast. The tracking configuration information may indicate a configuration of the STRSs for the identified target(s); namely, A-1 and A-2. In an example, the tracking configuration information 1306 may indicate that the STRS is repeated a number of times equal to the number of target(s) to be tracked. For example, in case of multiple targets or target groups, the tracking configuration information 1306 may include a repetition pattern (e.g., period, time offset, interval, etc.) for the repeating STRS and the corresponding target (or target group) identifications for the targets (or target groups) to be tracked. The tracking configuration information 1306 may be provided via RRC, MAC-CE, DCI, or other network signaling. A first transmission 1308 of the DL STRS #A enables UE A to track target A-1 at 1310, and a second transmission 1312 of the DL STRS #A enables UE A to track target A-2 at 1314. The STRSs 1308 and 1312 may be SS Blocks, CSI-RS, TRS, PRS or other current and future reference signals developed for RF sensing applications. The tracking at 1310 and 1314 may include obtaining one or more reference signal measurements such as RSRP, RSRQ, or SINR values associated with the DL STRS. The STRSs 1308 and 1312 may be QCLed with the SSRS in the scanning phase 1302 in some designs. In an example, the STRSs 1308 and 1312 may be event driven based on a tracking request received from UE A or another network node.

Referring to FIG. 13, at 1316, BS 304 further transmits tracking configuration information for target B-1 to UE B via unicast. The tracking configuration information may indicate a configuration of the STRSs for the identified target(s); namely, B-1. In an example, the tracking configuration information 1316 may indicate that the STRS is repeated a number of times equal to the number of target(s) to be tracked. For example, in case of multiple targets or target groups, the tracking configuration information 1316 may include a repetition pattern (e.g., period, time offset, interval, etc.) for the repeating STRS and the corresponding target (or target group) identifications for the targets (or target groups) to be tracked. The tracking configuration information 1316 may be provided via RRC, MAC-CE, DCI, or other network signaling. A single transmission 1318 of the DL STRS #B enables UE B to track target B-1 at 1320. The STRS 1318 may comprise SS Block(s), CSI-RS, TRS, PRS or other current and future reference signal(s) developed for RF sensing applications. The tracking at 1320 may include obtaining one or more reference signal measurements such as RSRP, RSRQ, or SINR values associated with the DL STRS. The STRS 1318 may be QCLed with the SSRS in the scanning phase 1302 in some designs. In an example, the STRS 1318 may be event driven based on a tracking request received from UE B or another network node.

Figure 14:
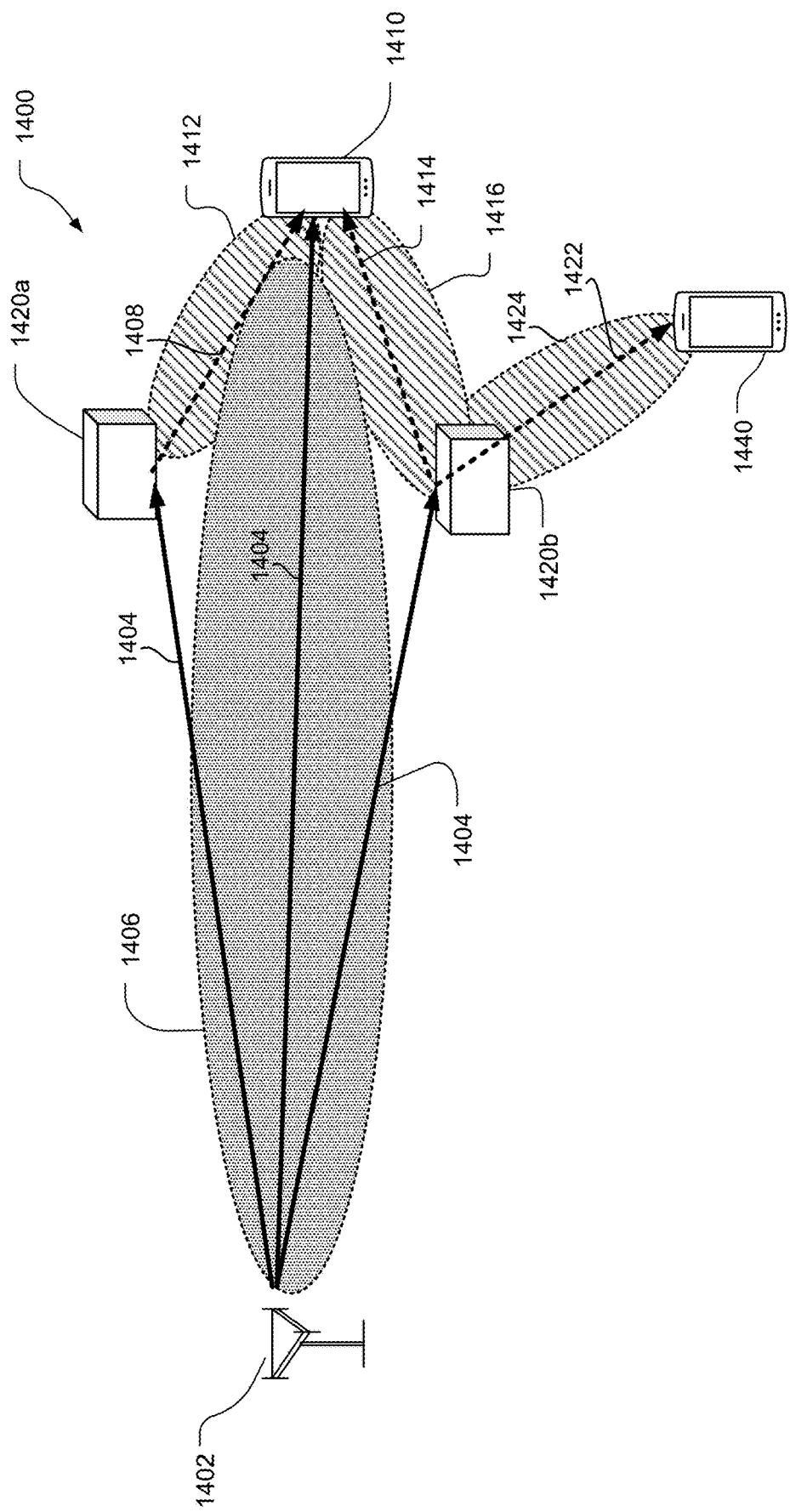
FIG. 14 illustrates a multi-UE tracking case in accordance with another aspect of the disclosure.

FIG. 14 illustrates a multi-UE tracking case 1400 in accordance with another aspect of the disclosure. Referring to FIG. 14, a BS 1402 is an example of the BS 304, and is configured to transmit a plurality of beamformed reference signals at varying angles, elevations and/or beam widths. A reference signal 1404 may be configured as a SSRS and/or a STRS and may be transmitted over a transmission beam 1406, and is received by a UE 1410 ("UE A") via multiple paths. For example, the reference signal 1404 may be reflected (or deflected) from a first target 1420a ("A-1") and received via a deflected signal 1408 on a first receive beam 1412. The reference signal 1404 may further be reflected (or deflected) from a second target 140b (identified by UE 1410 as "A-2") and received at UE 1410 via a deflected signal 1414 on a second receive beam 1416. The reference signal 1404 may further be reflected (or deflected) from the second target 1420b (identified by UE 1440 as "B-1") and received at UE 1440 ("UE B") via a deflected signal 1422 on a third receive beam 1424.

In the scenario of FIG. 14, the process 1300 of FIG. 13 may be implemented whereby BS 304 does not recognize that targets A-2 and B1 are in fact the same target. Embodiments of the disclosure are directed to aspects where an STRS is multicasted to multiple UEs, which may perform target tracking of respective target(s) based on the multicasted STRS. Such embodiments may provide various technological advantages, such as fewer STRS transmissions, which may reduce overhead, improve target tracking speed or efficiency, and so on. Such embodiments may provide particular technical advantages where the UEs to which the STRS is multicasted are tracking the same object, irrespective of whether the UEs or the BS recognize that the same target is being tracked.

Figure 15:
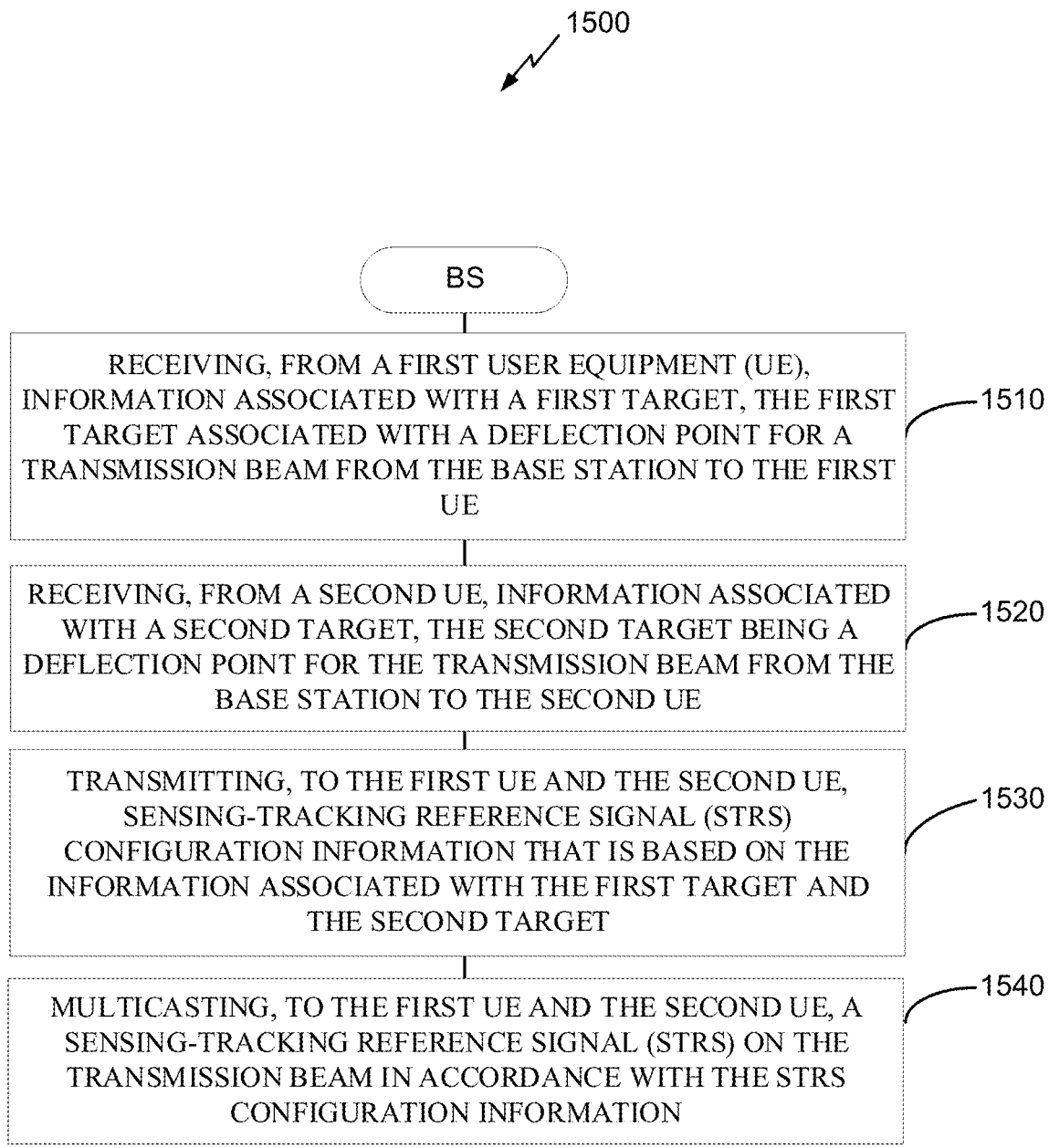
FIG. 15 illustrates an exemplary process of wireless communication, according to aspects of the disclosure.

FIG. 15 illustrates an exemplary process 1500 of wireless communication, according to aspects of the disclosure. In an aspect, the process 1500 may be performed by a BS, such as BS 304.

At 1510, BS 304 (e.g., receiver 352, receiver 362, etc.) receives, from a first UE, information associated with a first target, the first target associated with a deflection point for a transmission beam from the base station to the first UE. For example, the information received at 1510 may comprise a scanning signal report that identifies one or more targets detected at the first UE. The scanning signal report may comprise RSRP information associated with one or more SSRSs in some designs, a number of target IDs, etc. In some designs, the first target may be an individual target, while in other designs the first target may be representative of a target group.

At 1520, BS 304 (e.g., receiver 352, receiver 362, etc.) receives, from a second UE, information associated with a second target, the second target associated with a deflection point (e.g., same or different deflection point as the first target) for the transmission beam from the base station to the first UE. For example, the information received at 1520 may comprise a scanning signal report that identifies one or more targets detected at the second UE. The scanning signal report may comprise RSRP information associated with one or more SSRSs in some designs, a number of target IDs, etc. In some designs, the second target may be an individual target, while in other designs the first target may be representative of a target group.

At 1530, BS 304 (e.g., transmitter 354, transmitter 364, etc.) transmits, to the first and second UEs, STRS configuration information that is based on the information associated with the first and second targets (e.g., the first and second targets may be determined to be the same target and the STRS configuration information may then be configured with this knowledge so as to deflect to multiple UEs that detected this common target, etc.). In some designs, the STRS configuration information is transmitted to the first and second UEs via unicast (e.g., separate unicast messages). In other designs, the STRS configuration information is transmitted to the first and second UEs via multicast (e.g., a single multicast message). In a further example, the STRS configuration information may be transported via least one RRC signaling, MAC-CE signaling, or DCI signaling.

At 1540, BS 304 (e.g., transmitter 354, transmitter 364, etc.) multicasts, to the first and second UEs, an STRS on the transmission beam in accordance with the STRS configuration information.

Figure 16:
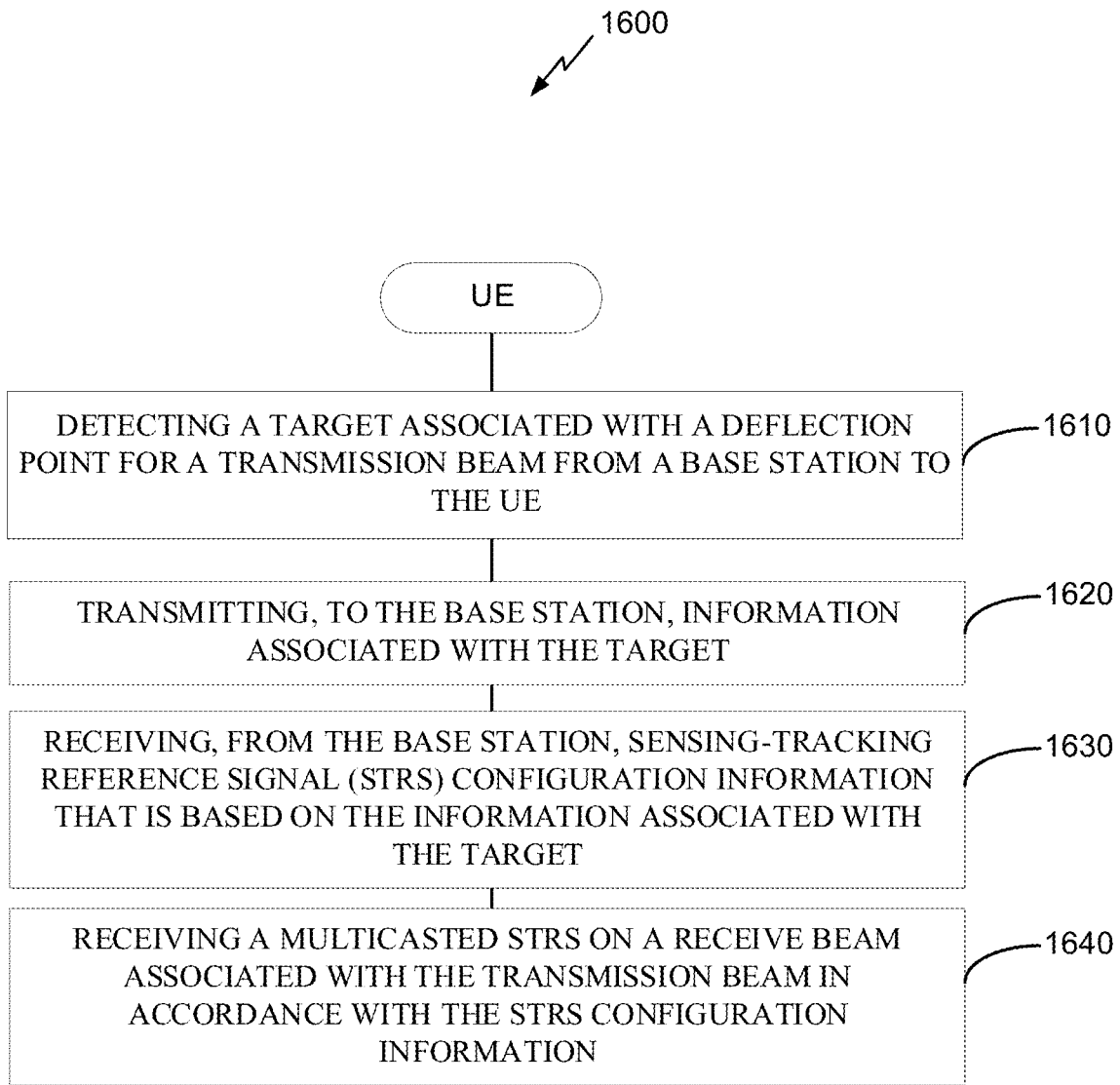
FIG. 16 illustrates an exemplary process of wireless communication, according to aspects of the disclosure.

FIG. 16 illustrates an exemplary process 1600 of wireless communication, according to aspects of the disclosure. In an aspect, the process 1600 may be performed by a UE, such as UE 302.

At 1610, UE 302 (e.g., receiver 312, receiver 322, RF sensing component 342, sensors 344, etc.) detects a target associated with a deflection point for a transmission beam from the base station to the first UE. For example, the detection at 1610 may be performed based on measurement of one or more SSRSs in some designs.

At 1620, UE 302 (e.g., transmitter 312, transmitter 322, etc.) transmits information associated with the target. For example, the information transmitted at 1520 may comprise a scanning signal report that identifies one or more targets detected at the UE at 1610. The scanning signal report may comprise RSRP information associated with one or more SSRSs in some designs, a number of target IDs, etc. In some designs, the target may be an individual target, while in other designs the target may be representative of a target group.

At 1630, UE 302 (e.g., receiver 314, receiver 324, etc.) receives, from the base station, STRS configuration information that is based on the information associated with the target (e.g., the target may be determined to be the same target as a target detected by other UE(s) and the STRS configuration information may then be configured with this knowledge so as to deflect to multiple UEs that detected this common target, etc.). In some designs, the STRS configuration information is received via unicast. In other designs, the STRS configuration information is received via multicast (e.g., a single multicast message targeted to multiple UEs). In a further example, the STRS configuration information may be transported via least one RRC signaling, MAC-CE signaling, or DCI signaling.

At 1640, UE 302 (e.g., receiver 312, receiver 322, RF sensing component 342, sensors 344, etc.) receives a multicasted STRS on a receive beam associated with the transmission beam in accordance with the STRS configuration information. While not shown expressly in FIG. 16, UE 302 may perform tracking of the target based on the multicasted STRS. In some designs, a plurality of multicasted STRSs may be received at UE 302 for tracking of separate targets and/or for redundant tracking of a particular target, as will be described in more detail below with respect to FIGS. 17-18.

Figure 17:
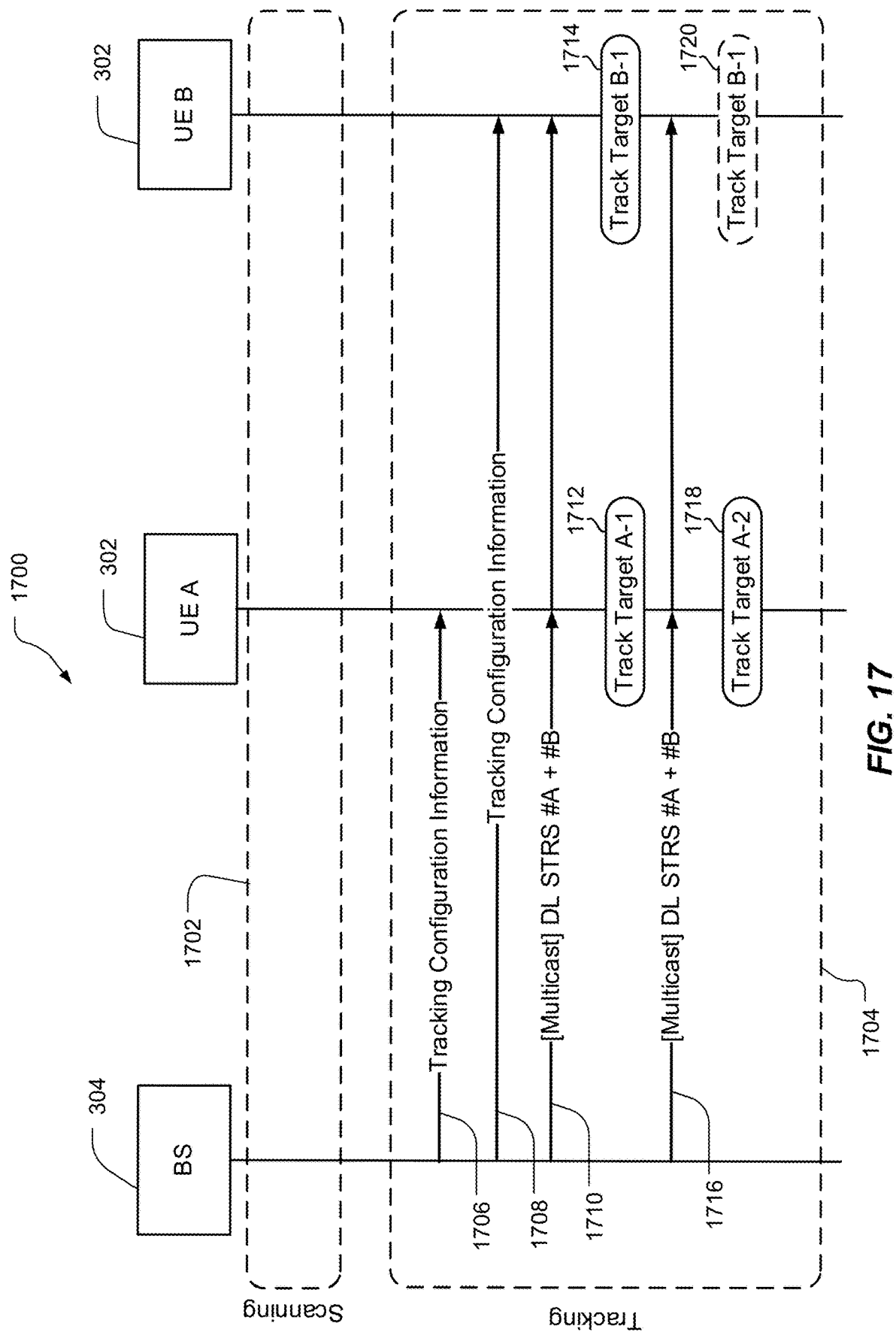
FIG. 17 illustrates an example implementation of the processes of FIGS. 15-16, respectively, in accordance with an aspect of the disclosure.

FIG. 17 illustrates an example implementation 1700 of the processes 1500-1600 of FIGS. 15-16, respectively, in accordance with an aspect of the disclosure. The process 1700 of FIG. 17 is a multi-user (or multi-UE) procedure, whereby a BS configured as BS 304 performs bistatic radio frequency sensing beam management on behalf of UEs A and B, each of which may be configured as UE 302. For example, UE A may correspond to UE 1410 from FIG. 14, and UE B may correspond to UE 1440 from FIG. 14. As noted above with respect to FIG. 14, the targets A-2 and B-1 (1420b) are the same target (or target group).

Referring to FIG. 17, a scanning phase 1702 is performed, the details of which are omitted and which may correspond to any of the scanning phases described above in any combination (e.g., 800 of FIG. 8C, etc.). As a result of the scanning phase 1702, assume that targets A-1, A-2 and B-1 are identified to BS 304, with targets A-2 and B-1 being a common target. In this case, even though targets A-2 and B-1 are a common target (i.e., the same target), assume that BS 304 does not have actual knowledge that the targets A-2 and B-1 correspond to the common target.

Referring to FIG. 17, a tracking phase 1704 is performed after the scanning phase 1702. At 1706, BS 304 transmits tracking configuration information for target A-1 and A-2 to UE A via unicast. The tracking configuration information may indicate a configuration of the STRSs for the identified target(s); namely, A-1 and A-2. In an example, the tracking configuration information 1706 may indicate that the STRS is repeated a number of times equal to the number of target(s) to be tracked. For example, in case of multiple targets or target groups, the tracking configuration information 1706 may include a repetition pattern (e.g., period, time offset, interval, etc.) for the repeating STRS and the corresponding target (or target group) identifications for the targets (or target groups) to be tracked. The tracking configuration information 1706 may be provided via RRC, MAC-CE, DCI, or other network signaling. In an example, the tracking configuration information 1706 may comprise target identifiers (A-1 and A-2) that are specific to UE A.

Referring to FIG. 17, at 1708, BS 304 further transmits tracking configuration information for target B-1 to UE B via unicast. The tracking configuration information may indicate a configuration of the STRSs for the identified target(s); namely, B-1. In an example, the tracking configuration information 1708 may indicate that the STRS is repeated a number of times equal to the number of target(s) to be tracked. For example, in case of multiple targets or target groups, the tracking configuration information 1716 may include a repetition pattern (e.g., period, time offset, interval, etc.) for the repeating STRS and the corresponding target (or target group) identifications for the targets (or target groups) to be tracked. In this case, the tracking configuration information 1708 is the same as the tracking configuration information 1706. So, even though UE B is only tracking one target (identified by UE B as B-1), the tracking configuration information 1708 comprises two STRS repetitions because UE A is tracking two targets (A-1 and A-2). The tracking configuration information 1708 may be provided via RRC, MAC-CE, DCI, or other network signaling. In an example, the tracking configuration information 1708 may comprise a target identifier (B-1) that is specific to UE B, even though the tracking configuration information 1706 may comprise a target identifier (A-2) that is specific to UE A for the same target (e.g., because BS 304 may not know that these targets are actually the same).

Referring to FIG. 17, a first multicast transmission 1710 of the DL STRS #A+#B enables UE A to track target A-1 at 1712 and further enables UE B to track target B-1 at 1714. A first multicast transmission 1760 of the DL STRS #A+#B enables UE A to track target A-2 at 1718 and further (optionally) enables UE B to track target B-1 at 1720. The tracking at 1720 is optional due to redundancy (e.g., UE B may instead opt to skip the tracking at 1720 to save power). Alternatively, UE B may perform the tracking at 1720 while skipping the tracking at 1714 (e.g., either tracking opportunity may be skipped to save power). The STRSs 1710 and 1716 may comprise SS Blocks, CSI-RS, TRS, PRS or other current and future reference signals developed for RF sensing applications. The tracking at 1712, 1714, 1718 and/or 1720 may include obtaining one or more reference signal measurements such as RSRP, RSRQ, or SINR values associated with the DL STRS. The STRSs 1710 and 1716 may be QCLed with the SSRS in the scanning phase 1702 in some designs. In an example, the STRSs 1710 and 1716 may be event driven based on a tracking request received from UE A or UE B or another network node.

Figure 18:
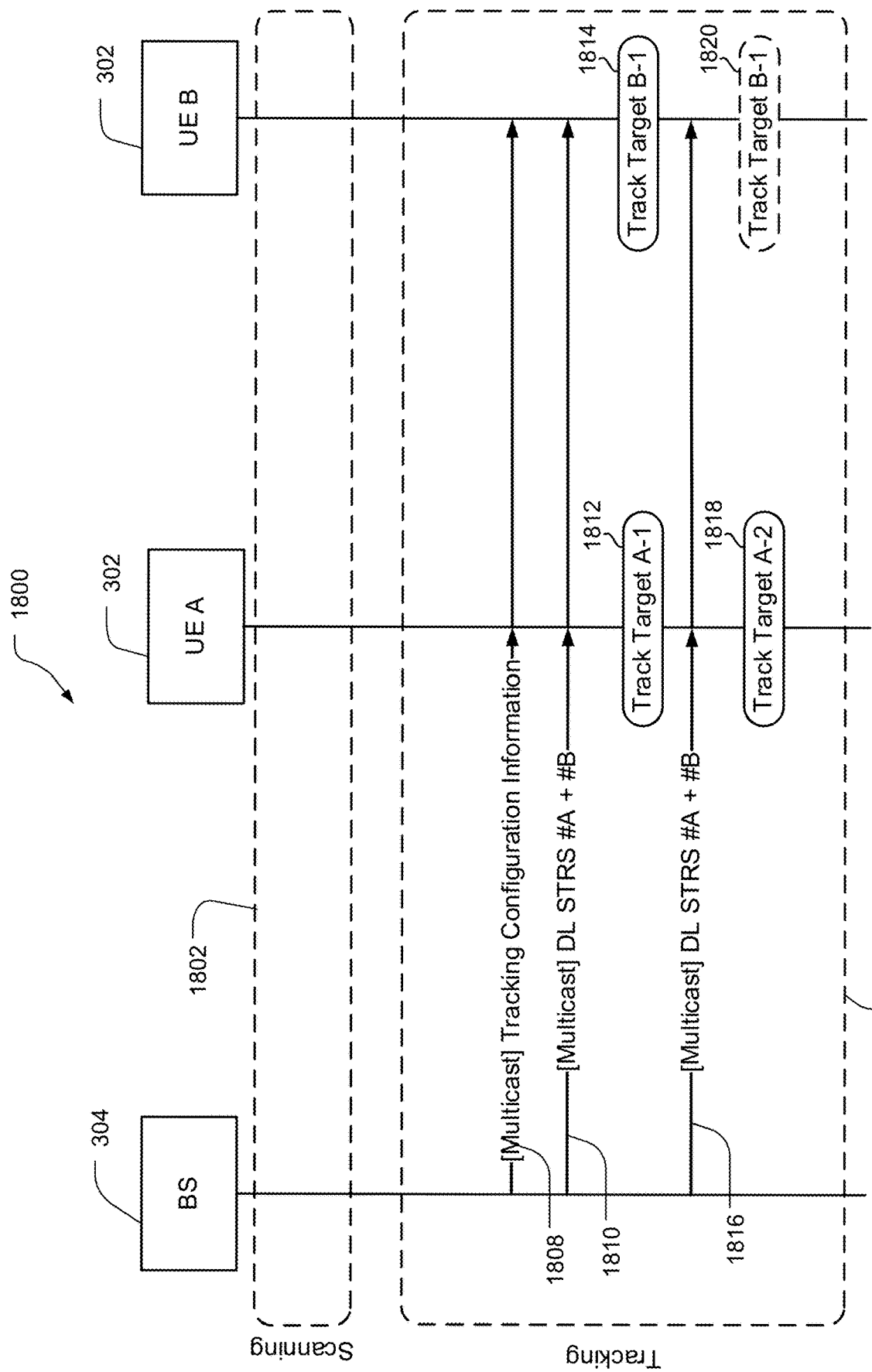
FIG. 18 illustrates an example implementation of the processes of FIGS. 15-16, respectively, in accordance with another aspect of the disclosure.

FIG. 18 illustrates an example implementation 1800 of the processes 1500-1600 of FIGS. 15-16, respectively, in accordance with another aspect of the disclosure. The process 1800 of FIG. 18 is a multi-user (or multi-UE) procedure, whereby a BS configured as BS 304 performs bistatic radio frequency sensing beam management on behalf of UEs A and B, each of which may be configured as UE 302. For example, UE A may correspond to UE 1410 from FIG. 14, and UE B may correspond to UE 1440 from FIG. 14. As noted above with respect to FIG. 14, the targets A-2 and B-1 (1420b) are the same target (or target group).

Referring to FIG. 18, a scanning phase 1802 is performed, the details of which are omitted and which may correspond to any of the scanning phases described above in any combination (e.g., 800 of FIG. 8C, etc.). As a result of the scanning phase 1802, assume that targets A-1, A-2 and B-1 are identified to BS 304, with targets A-2 and B-1 being a common target. In contrast to FIG. 17, assume that BS 304 determines that the targets A-2 and B-1 correspond to a common target (e.g., based on an evaluation of a range or speed of the target, an angle of the target relative to the transmission/receive beams or UEs A and/or B, etc.).

Referring to FIG. 18, a tracking phase 1804 is performed after the scanning phase 1802. At 1806, BS 304 transmits tracking configuration information for target A-1, A-2 and B-1 to UEs A and B via multicast. In some designs, the multicasted tracking configuration information may comprise a single identifier for each unique target (or target group). For example, for the target associated with A-2 and B-1, the target may be identified as A-2, B-1, or some other network-assigned (or network-specific) identifier. In other designs, the multicasted tracking configuration information may identify this target as associated with both A-2 and B-1 so that each of UEs A and B can identify the respective target using its own UE-specific identifier. In an example, the tracking configuration information 1808 may indicate that the STRS is repeated a number of times equal to the number of target(s) to be tracked by the UE with the most targets or target groups (e.g., in this case, UE A since UE A is tracking two targets and UE B is only tracking one target). For example, in case of multiple targets or target groups, the tracking configuration information 1808 may include a repetition pattern (e.g., period, time offset, interval, etc.) for the repeating STRS and the corresponding target (or target group) identifications for the targets (or target groups) to be tracked. The tracking configuration information 1808 may be provided via RRC, MAC-CE, DCI, or other network signaling. 1810-1820 of FIG. 18 correspond to 1710-1720 of FIG. 17, and as such will not be described herein for the sake of brevity.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a base station, comprising: receiving, from a first user equipment (UE), information associated with a first target, the first target associated with a deflection point for a transmission beam from the base station to the first UE; receiving, from a second UE, information associated with a second target, the second target being a deflection point for the transmission beam from the base station to the second UE; transmitting, to the first UE and the second UE, sensing-tracking reference signal (STRS) configuration information that is based on the information associated with the first target and the second target; and multicasting, to the first UE and the second UE, a sensing-tracking reference signal (STRS) on the transmission beam in accordance with the STRS configuration information.

Clause 2. The method of clause 1, wherein the STRS configuration information is transmitted to the first UE and the second UE via unicast.

Clause 3. The method of clause 2, wherein the first target and the second target correspond to a common target, and wherein the STRS configuration information is transmitted without the base station having knowledge that the first target and the second target correspond to the common target.

Clause 4. The method of clause 3, wherein a first STRS configuration information unicasted to the first UE comprises a first identifier that is specific to the first UE for the common target and wherein a second STRS configuration information unicasted to the second UE comprises a second identifier that is specific to the second UE for the common target.

Clause 5. The method of any of clauses 1 to 4, wherein the STRS configuration information is transmitted to the first UE and the second UE via multicast.

Clause 6. The method of clause 5, wherein the STRS configuration information is transmitted to the first and second UEs via multicast in response to determining, at the base station, that the first target and the second target correspond to a common target.

Clause 7. The method of clause 6, wherein the multicasted STRS configuration information comprises a network-specific identifier for the common target.

Clause 8. The method of any of clauses 1 to 7, wherein the STRS configuration information is transported via radio resource control (RRC) signaling, media access control command element (MAC-CE) signaling, or downlink control information (DCI) signaling.

Clause 9. A method of operating a user equipment (UE), comprising: detecting a target associated with a deflection point for a transmission beam from a base station to the UE; transmitting, to the base station, information associated with the target; receiving, from the base station, sensing-tracking reference signal (STRS) configuration information that is based on the information associated with the target; and receiving a multicasted a sensing-tracking reference signal (STRS) on a receive beam associated with the transmission beam in accordance with the STRS configuration information.

Clause 10. The method of clause 9, wherein the STRS configuration information is received via unicast.

Clause 11. The method of clause 10, wherein the STRS configuration information comprises an identifier for the target that is specific to the UE.

Clause 12. The method of any of clauses 9 to 11, wherein the STRS configuration information is received via multicast.

Clause 13. The method of clause 12, wherein the multicasted STRS configuration information comprises a network-specific identifier for the target.

Clause 14. The method of any of clauses 9 to 13, wherein the STRS configuration information is transported via radio resource control (RRC) signaling, media access control command element (MAC-CE) signaling, or downlink control information (DCI) signaling.

Clause 15. A base station, comprising: a memory; at least one transceiver; and at least one processor communicatively coupled to the memory and the at least one transceiver, the at least one processor configured to: receive, via the at least one transceiver, from a first user equipment (UE), information associated with a first target, the first target associated with a deflection point for a transmission beam from the base station to the first UE; receive, via the at least one transceiver, from a second UE, information associated with a second target, the second target being a deflection point for the transmission beam from the base station to the second UE; transmit, via the at least one transceiver, to the first UE and the second UE, sensing-tracking reference signal (STRS) configuration information that is based on the information associated with the first target and the second target; and multicast, to the first UE and the second UE, a sensing-tracking reference signal (STRS) on the transmission beam in accordance with the STRS configuration information.

Clause 16. The base station of clause 15, wherein the STRS configuration information is transmitted to the first UE and the second UE via unicast.

Clause 17. The base station of clause 16, wherein the first target and the second target correspond to a common target, and wherein the STRS configuration information is transmitted without the base station having knowledge that the first target and the second target correspond to the common target.

Clause 18. The base station of clause 17, wherein a first STRS configuration information unicasted to the first UE comprises a first identifier that is specific to the first UE for the common target and wherein a second STRS configuration information unicasted to the second UE comprises a second identifier that is specific to the second UE for the common target.

Clause 19. The base station of any of clauses 15 to 18, wherein the STRS configuration information is transmitted to the first UE and the second UE via multicast.

Clause 20. The base station of clause 19, wherein the STRS configuration information is transmitted to the first and second UEs via multicast in response to determining, at the base station, that the first target and the second target correspond to a common target.

Clause 21. The base station of clause 20, wherein the multicasted STRS configuration information comprises a network-specific identifier for the common target.

Clause 22. The base station of any of clauses 15 to 21, wherein the STRS configuration information is transported via radio resource control (RRC) signaling, media access control command element (MAC-CE) signaling, or downlink control information (DCI) signaling.

Clause 23. A user equipment (UE), comprising: a memory; at least one transceiver; and at least one processor communicatively coupled to the memory and the at least one transceiver, the at least one processor configured to: detect a target associated with a deflection point for a transmission beam from a base station to the UE; transmit, via the at least one transceiver, to the base station, information associated with the target; receive, via the at least one transceiver, from the base station, sensing-tracking reference signal (STRS) configuration information that is based on the information associated with the target; and receive, via the at least one transceiver, a multicasted a sensing-tracking reference signal (STRS) on a receive beam associated with the transmission beam in accordance with the STRS configuration information.

Clause 24. The UE of clause 23, wherein the STRS configuration information is received via unicast.

Clause 25. The UE of clause 24, wherein the STRS configuration information comprises an identifier for the target that is specific to the UE.

Clause 26. The UE of any of clauses 23 to 25, wherein the STRS configuration information is received via multicast.

Clause 27. The UE of clause 26, wherein the multicasted STRS configuration information comprises a network-specific identifier for the target.

Clause 28. The UE of any of clauses 23 to 27, wherein the STRS configuration information is transported via radio resource control (RRC) signaling, media access control command element (MAC-CE) signaling, or downlink control information (DCI) signaling.

Clause 29. A base station, comprising: means for receiving, from a first user equipment (UE), information associated with a first target, the first target associated with a deflection point for a transmission beam from the base station to the first UE; means for receiving, from a second UE, information associated with a second target, the second target being a deflection point for the transmission beam from the base station to the second UE; means for transmitting, to the first UE and the second UE, sensing-tracking reference signal (STRS) configuration information that is based on the information associated with the first target and the second target; and means for multicasting, to the first UE and the second UE, a sensing-tracking reference signal (STRS) on the transmission beam in accordance with the STRS configuration information.

Clause 30. The base station of clause 29, wherein the STRS configuration information is transmitted to the first UE and the second UE via unicast.

Clause 31. The base station of clause 30, wherein the first target and the second target correspond to a common target, and wherein the STRS configuration information is transmitted without the base station having knowledge that the first target and the second target correspond to the common target.

Clause 32. The base station of clause 31, wherein a first STRS configuration information unicasted to the first UE comprises a first identifier that is specific to the first UE for the common target and wherein a second STRS configuration information unicasted to the second UE comprises a second identifier that is specific to the second UE for the common target.

Clause 33. The base station of clause 29, wherein the STRS configuration information is transmitted to the first UE and the second UE via multicast.

Clause 34. The base station of clause 33, wherein the STRS configuration information is transmitted to the first and second UEs via multicast in response to determining, at the base station, that the first target and the second target correspond to a common target.

Clause 35. The base station of clause 34, wherein the multicasted STRS configuration information comprises a network-specific identifier for the common target.

Clause 36. The base station of clause 29, wherein the STRS configuration information is transported via radio resource control (RRC) signaling, media access control command element (MAC-CE) signaling, or downlink control information (DCI) signaling.

Clause 37. A user equipment (UE), comprising: means for detecting a target associated with a deflection point for a transmission beam from a base station to the UE; means for transmitting, to the base station, information associated with the target; means for receiving, from the base station, sensing-tracking reference signal (STRS) configuration information that is based on the information associated with the target; and means for receiving a multicasted a sensing-tracking reference signal (STRS) on a receive beam associated with the transmission beam in accordance with the STRS configuration information.

Clause 38. The UE of clause 37, wherein the STRS configuration information is received via unicast.

Clause 39. The UE of clause 38, wherein the STRS configuration information comprises an identifier for the target that is specific to the UE.

Clause 40. The UE of any of clauses 37 to 39, wherein the STRS configuration information is received via multicast.

Clause 41. The UE of clause 40, wherein the multicasted STRS configuration information comprises a network-specific identifier for the target.

Clause 42. The UE of any of clauses 37 to 41, wherein the STRS configuration information is transported via radio resource control (RRC) signaling, media access control command element (MAC-CE) signaling, or downlink control information (DCI) signaling.

Clause 43. A non-transitory computer-readable medium storing computer-executable instructions that, when executed by a base station, cause the base station to: receive, from a first user equipment (UE), information associated with a first target, the first target associated with a deflection point for a transmission beam from the base station to the first UE; receive, from a second UE, information associated with a second target, the second target being a deflection point for the transmission beam from the base station to the second UE; transmit, to the first UE and the second UE, sensing-tracking reference signal (STRS) configuration information that is based on the information associated with the first target and the second target; and multicast, to the first UE and the second UE, a sensing-tracking reference signal (STRS) on the transmission beam in accordance with the STRS configuration information.

Clause 44. The non-transitory computer-readable medium of clause 43, wherein the STRS configuration information is transmitted to the first UE and the second UE via unicast.

Clause 45. The non-transitory computer-readable medium of clause 44, wherein the first target and the second target correspond to a common target, and wherein the STRS configuration information is transmitted without the base station having knowledge that the first target and the second target correspond to the common target.

Clause 46. The non-transitory computer-readable medium of clause 45, wherein a first STRS configuration information unicasted to the first UE comprises a first identifier that is specific to the first UE for the common target and wherein a second STRS configuration information unicasted to the second UE comprises a second identifier that is specific to the second UE for the common target.

Clause 47. The non-transitory computer-readable medium of any of clauses 43 to 46, wherein the STRS configuration information is transmitted to the first UE and the second UE via multicast.

Clause 48. The non-transitory computer-readable medium of clause 47, wherein the STRS configuration information is transmitted to the first and second UEs via multicast in response to determining, at the base station, that the first target and the second target correspond to a common target.

Clause 49. The non-transitory computer-readable medium of clause 48, wherein the multicasted STRS configuration information comprises a network-specific identifier for the common target.

Clause 50. The non-transitory computer-readable medium of any of clauses 43 to 49, wherein the STRS configuration information is transported via radio resource control (RRC) signaling, media access control command element (MAC-CE) signaling, or downlink control information (DCI) signaling.

Clause 51. A non-transitory computer-readable medium storing computer-executable instructions that, when executed by a user equipment (UE), cause the UE to: detect a target associated with a deflection point for a transmission beam from a base station to the UE; transmit, to the base station, information associated with the target; receive, from the base station, sensing-tracking reference signal (STRS) configuration information that is based on the information associated with the target; and receive a multicasted a sensing-tracking reference signal (STRS) on a receive beam associated with the transmission beam in accordance with the STRS configuration information.

Clause 52. The non-transitory computer-readable medium of clause 51, wherein the STRS configuration information is received via unicast.

Clause 53. The non-transitory computer-readable medium of clause 52, wherein the STRS configuration information comprises an identifier for the target that is specific to the UE.

Clause 54. The non-transitory computer-readable medium of any of clauses 51 to 53, wherein the STRS configuration information is received via multicast.

Clause 55. The non-transitory computer-readable medium of clause 54, wherein the multicasted STRS configuration information comprises a network-specific identifier for the target.

Clause 56. The non-transitory computer-readable medium of any of clauses 51 to 55, wherein the STRS configuration information is transported via radio resource control (RRC) signaling, media access control command element (MAC-CE) signaling, or downlink control information (DCI) signaling.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a network component, comprising:
   receiving, from a first user equipment (UE), information associated with a first target, the first target associated with a deflection point for a transmission beam from the network component to the first UE;
   receiving, from a second UE, information associated with a second target, the second target being a deflection point for the transmission beam from the network component to the second UE;
   transmitting, to the first UE and the second UE, sensing-tracking reference signal (STRS) configuration information that is based on the information associated with the first target and the second target;
   multicasting, at least to the first UE and the second UE, a sensing-tracking reference signal (STRS) on the transmission beam in accordance with the STRS configuration information;
   wherein the first target and the second target correspond to a common target; and
   wherein the STRS configuration information is transmitted without the network component having knowledge that the first target and the second target correspond to the common target.

2. The method of claim 1, wherein the STRS configuration information is transmitted to the first UE and the second UE via unicast.

3. The method of claim 1,
   wherein a first STRS configuration information unicasted to the first UE comprises a first identifier that is specific to the first UE for the common target and
   wherein a second STRS configuration information unicasted to the second UE comprises a second identifier that is specific to the second UE for the common target.

4. The method of claim 1, wherein the STRS configuration information is transmitted to the first UE and the second UE via multicast.

5. The method of claim 4, wherein the STRS configuration information is transmitted to the first and second UEs via multicast in response to determining, at the network component, that the first target and the second target correspond to a common target.

6. The method of claim 5, wherein the multicasted STRS configuration information comprises a network-specific identifier for the common target.

7. The method of claim 1, wherein the STRS configuration information is transported via radio resource control (RRC) signaling, media access control command element (MAC-CE) signaling, or downlink control information (DCI) signaling.

8. A method of operating a user equipment (UE), comprising:
   detecting a target associated with a deflection point for a transmission beam from a network component to the UE;
   transmitting, to the network component, information associated with the target;
   receiving, from the network component, sensing-tracking reference signal (STRS) configuration information that is based on the information associated with the target;
   receiving a multicasted a sensing-tracking reference signal (STRS) on a receive beam associated with the transmission beam in accordance with the STRS configuration information;
   wherein the target corresponds to a common target that is a second target of a second UE; and
   wherein the STRS configuration information is transmitted without the network component having knowledge that the target and the second target correspond to the common target.

9. The method of claim 8, wherein the STRS configuration information is received via unicast.

10. The method of claim 9, wherein the STRS configuration information comprises an identifier for the target that is specific to the UE.

11. The method of claim 8, wherein the STRS configuration information is received via multicast.

12. The method of claim 11, wherein the multicasted STRS configuration information comprises a network-specific identifier for the target.

13. The method of claim 8, wherein the STRS configuration information is transported via radio resource control (RRC) signaling, media access control command element (MAC-CE) signaling, or downlink control information (DCI) signaling.

14. A network component, comprising:
   a memory;
   at least one transceiver; and
   at least one processor communicatively coupled to the memory and the at least one transceiver, the at least one processor configured to:
   receive, via the at least one transceiver, from a first user equipment (UE), information associated with a first target, the first target associated with a deflection point for a transmission beam from the network component to the first UE;
   receive, via the at least one transceiver, from a second UE, information associated with a second target, the second target being a deflection point for the transmission beam from the network component to the second UE;
   transmit, via the at least one transceiver, to the first UE and the second UE, sensing-tracking reference signal (STRS) configuration information that is based on the information associated with the first target and the second target;
   multicast, at least to the first UE and the second UE, a sensing-tracking reference signal (STRS) on the transmission beam in accordance with the STRS configuration information;

wherein the first target and the second target correspond to a common target; and wherein the STRS configuration information is transmitted without the network component having knowledge that the first target and the second target correspond to the common target.

15. The network component of claim 14, wherein the STRS configuration information is transmitted to the first UE and the second UE via unicast.

16. The network component of claim 14,
wherein a first STRS configuration information unicasted to the first UE comprises a first identifier that is specific to the first UE for the common target and
wherein a second STRS configuration information unicasted to the second UE comprises a second identifier that is specific to the second UE for the common target.

17. The network component of claim 14, wherein the STRS configuration information is transmitted to the first UE and the second UE via multicast.

18. The network component of claim 17, wherein the STRS configuration information is transmitted to the first and second UEs via multicast in response to determining, at the network component, that the first target and the second target correspond to a common target.

19. The network component of claim 18, wherein the multicasted STRS configuration information comprises a network-specific identifier for the common target.

20. The network component of claim 14, wherein the STRS configuration information is transported via radio resource control (RRC) signaling, media access control command element (MAC-CE) signaling, or downlink control information (DCI) signaling.

21. A user equipment (UE), comprising:
a memory;
at least one transceiver; and
at least one processor communicatively coupled to the memory and the at least one transceiver, the at least one processor configured to:

detect a target associated with a deflection point for a transmission beam from a network component to the UE;

transmit, via the at least one transceiver, to the network component, information associated with the target;

receive, via the at least one transceiver, from the network component, sensing-tracking reference signal (STRS) configuration information that is based on the information associated with the target;

receive, via the at least one transceiver, a multicasted a sensing-tracking reference signal (STRS) on a receive beam associated with the transmission beam in accordance with the STRS configuration information;

wherein the target corresponds to a common target that is a second target of a second UE; and wherein the STRS configuration information is transmitted without the network component having knowledge that the target and the second target correspond to the common target.

22. The UE of claim 21, wherein the STRS configuration information is received via unicast.

23. The UE of claim 22, wherein the STRS configuration information comprises an identifier for the target that is specific to the UE.

24. The UE of claim 21, wherein the STRS configuration information is received via multicast.

25. The UE of claim 24, wherein the multicasted STRS configuration information comprises a network-specific identifier for the target.

26. The UE of claim 21, wherein the STRS configuration information is transported via radio resource control (RRC) signaling, media access control command element (MAC-CE) signaling, or downlink control information (DCI) signaling.

* * * * *